US012623357B2

(12) United States Patent (10) Patent No.: US 12,623,357 B2
Schulz et al. (45) Date of Patent: May 12, 2026

(54) POSE DETERMINATION IN PARALLEL KINEMATICS SYSTEMS WITH REFERENCE MARKERS

(71) Applicant: PHYSIK INSTRUMENTE (PI) SE & CO. KG, Karlsruhe (DE)

(72) Inventors: Stefan Schulz, Pfinztal (DE); Constantin Schempp, Donnbronn (DE)

(73) Assignee: PHYSIK INSTRUMENTE (PI) SE & CO. KG (DE)

( * ) Notice: Subject to any disclaimer, the term of this patent is extended or adjusted under 35 U.S.C. 154(b) by 0 days.

(21) Appl. No.: 18/711,771

(22) PCT Filed: Nov. 22, 2022

(86) PCT No.: PCT/EP2022/082765
§ 371 (c)(1),
(2) Date: May 20, 2024

(87) PCT Pub. No.: WO2023/094366
PCT Pub. Date: Jun. 1, 2023

(65) Prior Publication Data
US 2025/0018582 A1 Jan. 16, 2025

(30) Foreign Application Priority Data

Nov. 26, 2021 (DE) ..................... 10 2021 213 358.4

(51) Int. Cl.
B25J 13/08 (2006.01)
G06K 7/10 (2006.01)
(Continued)

(52) U.S. Cl.
CPC ........ B25J 13/088 (2013.01); G06K 7/10722 (2013.01); G06K 7/1417 (2013.01); B25J 9/0069 (2013.01)

(58) Field of Classification Search
CPC ...... B25J 13/088; B25J 9/0069; B25J 9/1623; B25J 9/1692; G06K 7/10722; G06K 7/1417; G01B 11/26; G01B 11/002
See application file for complete search history.

(56) References Cited

U.S. PATENT DOCUMENTS 8,442,677 B2 * 5/2013 Shoham ................. B25J 9/1623
700/250
8,619,144 B1 * 12/2013 Chang .................. H04N 17/002
348/187

(Continued)

FOREIGN PATENT DOCUMENTS

CN 104731103 A 6/2015
DE 10 2015 212 352 A1 1/2017
(Continued)

OTHER PUBLICATIONS

Medeiros, Rodrigo Alves, Guilherme Araujo Pimentel, and Rafael Garibotti. "An embedded quaternion-based Extended Kalman Filter pose estimation for six degrees of freedom systems." Journal of Intelligent & Robotic Systems 102.1 (2021): 18. (Year: 2021).*

(Continued)

*Primary Examiner* — Adam R Mott
*Assistant Examiner* — Matthew C Gammon
(74) *Attorney, Agent, or Firm* — Harness, Dickey & Pierce, P.L.C.

(57) ABSTRACT

A parallel kinematic system comprises mutually distinguishable markings which are attached in a marking region to the parallel kinematic system. The marking region is a region of the kinematic system that moves along with the pose of the kinematic system. The markings can be attached in a direction at a distance that ensures that n markings are always fully visible in the direction, and the pose of the parallel kinematic system can be determined based on an image that is captured by the camera and contains at least n markings (Continued)

in the direction. The markings can be attached in a direction at a distance that ensures that n or more markings are fully visible in the direction, the markings are attached in different planes, and the pose of the parallel kinematic system can be determined based on an image that is captured by the camera and contains at least any n markings in the direction.

10 Claims, 10 Drawing Sheets

(51) Int. Cl.
    *G06K 7/14*         (2006.01)
    *B25J 9/00*         (2006.01)

(56)           References Cited

U.S. PATENT DOCUMENTS 8,662,676 B1 \*   3/2014   Chang ................. H04N 17/002
                                353/69
2015/0081100 A1 \*   3/2015   Gottlieb ................ B25J 9/1692
                                700/262

FOREIGN PATENT DOCUMENTS

| DE | 10 2016 212 695 B4 | 2/2019 |
| DE | 10 2020 114 673 B3 | 7/2021 |
| DE | 10 2020 209 486 B3 | 9/2021 |
| DE | 10 2020 124 136 A1 | 3/2022 |
| EP | 3 706 080 A1 | 9/2020 |

OTHER PUBLICATIONS

Moldagalieva, Akmaral, et al. "Computer vision-based pose estimation of tensegrity robots using fiducial markers." 2019 IEEE/SICE International Symposium on System Integration (SII). IEEE, 2019. (Year: 2019).\*

Medeiros Rodrigo Alves et al. "An Embedded Quaternion-Based Extended Kalman Filter Pose Estimation for Six Degrees of Freedom Systems" Journal of Intelligent, Springer Netherlands, Dordrecht, vol. 102, No. 1, Apr. 22, 2021 (Apr. 22, 2021), [retrieved on Apr. 22, 2021] DOI: 10.1007/S 10846-021-01377-3 ISSN: 0921-0296, XP037431234 pp. 11-16.

Zhang Xuanchen et al. "Stereo vision based autonomous robot calibration" Robotics and Autonomous Systems, Amsterdam, NL, vol. 93, Jul. 1, 2017 (Jul. 1, 2017), pp. 43-51 DOI: 10.1016/j.robot. 2017.04.001 ISSN: 0921-8890, XP093006864 pp. 46-48.

Moldagalieva, Akmaral, et al. "Computer vision-based pose estimation of tensegrity robots using fiducial markers." 2019 IEEE/SICE International Symposium on System Integration (Sil) IEEE, 2019.

International Search Report for corresponding International Application No. PCT/JP2022/082765, mailed Feb. 14, 2023, with English translation (5 Pages).

\* cited by examiner

AprilTag Array 150

Camera 110

Manipulator platform 140

Base platform 120

Manipulator platform 140

Objective 130

Camera 110

Base platform 120

Manipulator platform 140

AprilTag Array 150

Objective 130

Base platform 120

Camera 110

AprilTag Array 150

Manipulator platform 140

Objective 130

Base platform 120

Camera 110

Markierungen 1350

Markierungen 1350

Markierungsbereich 1300

Fig. 13e

POSE DETERMINATION IN PARALLEL KINEMATICS SYSTEMS WITH REFERENCE MARKERS

CROSS REFERENCE TO RELATED APPLICATIONS

This application is a U.S. National Phase application under 35 U.S.C. 371 of International Application No. PCT/EP2022/082765, filed on Nov. 22, 2022, which claims priority to German Patent Application No. 10 2021 213 358.4, filed on Nov. 26, 2021. The entire disclosures of the above applications are expressly incorporated by reference herein.

TECHNICAL FIELD

The present invention relates to devices and methods for determining the pose of parallel kinematic systems.

BACKGROUND ART

A common problem when controlling a robot is determining its current pose (position and orientation).

However, in particular in parallel kinematic systems, the pose, i.e. the position and orientation of the movable work platform, for example, of a hexapod, cannot be calculated directly and/or precisely from the lengths of the driven legs or joint angles. Instead, numerical methods, e.g. iterative optimization methods, are necessary for this. On the one hand, these methods are time-consuming and computationally intensive, and the level of accuracy that can be obtained depends largely on the initial estimate used. On the other hand, they are typically based on a measurement of the leg lengths and/or joint angles using internal sensors (e.g. incremental sensors for measuring the leg lengths of a hexapod), which means that influences such as offset, deformation, play and counterplay (backlash) in the legs, joints and/or or the movable platform itself cannot be detected (even with absolute sensors in the legs) and therefore cannot be taken into account by a numerical method based thereon. Furthermore, with incremental sensors, for example, complex reference runs are necessary to obtain a zero position of the legs, and there are special parallel kinematic systems for which no numerical methods are available.

However, if external, optical incremental and absolute sensors are used, a large number of sensors are typically necessary in order to be able to measure all degrees of freedom. Due to the restricted measuring range of the sensors, it is also often not possible to obtain large adjustment motions of the parallel kinematic system.

When using 6D measurement technology by way of photogrammetry, a large number of images from as many different positions as possible are often necessary to generate an exact 3D scan. Since a comparatively large region has to be captured, only a relatively low level of accuracy can be obtained and an extremely high resolution of the camera is necessary in order to be able to detect changes in position, for example, in the nanometer range.

Moldagalieva, Akmaral, et al. "Computer vision-based pose estimation of tensegrity robots using fiducial markers." 2019 IEEE/SICE International Symposium on System Integration (SiI) IEEE, 2019, discloses a method based on fiducial tags that attempts to keep the entire workspace of the robot in view (in the image region) of the camera. This means that the viewing region of the camera must be very large and the camera must therefore be set up quite a distance away from the movable work platform. Since the accuracy obtainable for a given camera resolution reduces as the camera's distance from the tag increases, this method can only be used to determine the pose of the kinematic system with a low level of accuracy.

The present invention is therefore based on the object of improving the determination of the pose of parallel kinematic systems.

The object is satisfied according to the invention by the features of the independent claims. Some advantageous embodiments are the object of the dependent claims.

SUMMARY

The invention is based on the idea of attaching several reference markers to a parallel kinematic system such that at least one of the reference markers or a certain minimum number of reference markers is always in the field of view of the camera.

According to a first aspect of the present invention, a parallel kinematic system is provided. The parallel kinematic system comprises a camera and a marking region with mutually distinguishable markings, where the camera is configured to observe the marking region in different poses (or even in all possible poses) of the parallel kinematic system. The pose of the parallel kinematic system can be determined based on an image of the marking region captured by the camera if the image contains at least a number n of any of the markings in a direction, where n is greater than or equal to 1. The distance D between any two markings that are adjacent in a direction satisfies the formula $$\frac{FOV_{min} - (n+2)*t_m}{n+1} < D \le \frac{FOV_{min} - (n+1)*t_m}{n},$$

where $t_m$ is the length of one of the markings, $FOV_{min}$ is the length of the section of the marking region that falls into the field of view of the camera at a minimum distance of the camera from the marking region, and the minimum distance is the minimum distance among distances that the marking region can be away from the camera due to pose changes.

According to a second aspect of the present invention, a method for attaching mutually distinguishable markings to a parallel kinematic system in a marking region is provided so that the pose of the parallel kinematic system can be determined based on an image of the marking region if at least a predetermined number, n, of markings is disposed in a direction in the image. The method comprises a step of determining the distance D between any two markings that are adjacent in the direction according to the formula:

$$\frac{FOV_{min} - (n+2)*t_m}{n+1} < D \le \frac{FOV_{min} - (n+1)*t_m}{n},$$

where $t_m$ is the length of one of the markings, $FOV_{min}$ is the length of the section of the marking region that falls into the field of view of the camera at a minimum distance of the camera from the marking region, where the minimum distance is the minimum distance among the distances that the marking region can be away from the camera due to pose changes. The method further comprises a step of attaching adjacent markings having the determined distance.

According to a third aspect of the present invention, a parallel kinematic system is provided. The parallel kinematic system comprises a camera and a marking region with mutually distinguishable markings attached thereonto, where the camera is configured to observe the marking region in different poses (or even in all possible poses) of the parallel kinematic system. The distance D between any two markings that are adjacent in a direction satisfies the formula $$D \leq \frac{FOV_{min} - (n+1) * t_m}{n},$$

where $t_m$ is the length of one of the markings, $FOV_{min}$ is the length of the section of the marking region which falls into the field of view of the camera at a minimum distance of the camera from the marking region, and the minimum distance is the minimum distance among the distances that the marking region can be away from the camera due to pose changes. Furthermore, the markings are disposed in different planes and the pose of the parallel kinematic system can be determined based on an image captured by the camera if it contains at least a number, n, of any of the markings in the direction, where n is greater than or equal to 2.

According to a fourth aspect of the present invention, a method for attaching mutually distinguishable markings to a parallel kinematic system in a marking region is provided, so that the pose of the parallel kinematic system can be determined based on an image of the marking region captured by a camera, if at least a predetermined number, n, of the markings in the image is disposed in a direction, where n is greater than or equal to 2. The method comprises a step of determining the distance D between any two markings that are adjacent in the direction according to the formula: D≤([FOV]_min−(n+1)*t_m)/n, where t_m is the length of one of the markings, [FOV]_min is the length of the section of the marking region that falls into the field of view of the camera at a minimum distance of the camera away from the marking region, where the minimum distance is the minimum distance among the distances that the marking region can be away from the camera due to pose changes. The method further comprises a step of attaching respective markings that are adjacent in the direction at the determined distance, where the markings are attached so that they are disposed in different planes.

In general, the length $FOV_{min}$ in embodiments of the first to fourth aspect can satisfy the equation $$FOV_{min} = \left(\frac{g_{min}}{f} - 1\right) l_{sensor},$$

where $g_{min}$ is the minimum distance, $l_{Sensor}$ is a length of the sensor of the camera, and f is the focal distance of the camera.

In general, the markings in embodiments of the first and third aspect can be arranged in the marking region according to a regular arrangement pattern.

In general, the markings in the attachment step in embodiments of the second and fourth aspect can be attached in the marking region according to a regular arrangement pattern.

In general, the marking region in embodiments of the first and third aspect can be attached on the underside of the work platform of the parallel kinematic system, and the camera can be attached in or on a base of the parallel kinematic system and directed towards the underside of the work platform.

In general, the marking region in embodiments of the first and third aspect can be attached in or on a base of the parallel kinematic system and the camera can be attached to the underside of the work platform of the parallel kinematic system, and the camera can be directed towards the base of the parallel kinematic system. In the step of attaching the marking region in embodiments of the first and third aspect, the latter can be attached alternatively in or on a base of the parallel kinematic system, and the camera can be attached to the underside of the work platform of the parallel kinematic system and directed towards the base of the parallel kinematic system.

In general, in the step of attaching the marking region in the step of attaching the marking region, the latter can be attached to the underside of the work platform of the parallel kinematic system, and/or the camera can be attached in or on a base of the parallel kinematic system and directed towards the underside of the work platform. In the step of attaching the marking region in in embodiments of the second and fourth aspect, the latter can alternatively be attached in or on a base of the parallel kinematic system, and the camera can be attached to the underside of the work platform of the parallel kinematic system and directed towards the base of the parallel kinematic system.

In embodiments of the first to fourth aspects, the length $t_m$ of a marking in general satisfies the equation $$t_m \geq px * p * t_b * \left(\frac{g_{max}}{f} - 1\right),$$

where p is a value dependent upon the camera greater than or equal to 2 and less than or equal to 5, px is the length corresponding to a sampling value of the camera, $g_{max}$ is the maximum distance among the distances that the marking region can be away from the camera due to pose changes, f is a focal distance of the camera, and $t_b$ is the number of information units of the marking.

In general, the markings in embodiments of the first to fourth aspect can be reference markers, such as ARToolKit markings, ArUco markings, QR codes or in particular AprilTag markings.

In general, each of the markings in embodiments of the first to fourth aspects can consist of several squares, where the squares correspond to the information units and one bit is encodable in each square.

BRIEF DESCRIPTION OF THE DRAWINGS

Further details, advantages, and features of the invention shall arise from the following description and the drawings to which reference is expressly made with regard to all details not described in the text, where:

FIG. 13e shows a schematic representation of a periodic pattern according to which the markings can be attached in three different planes.

DETAILED DESCRIPTION

Figures 1A, 1B:
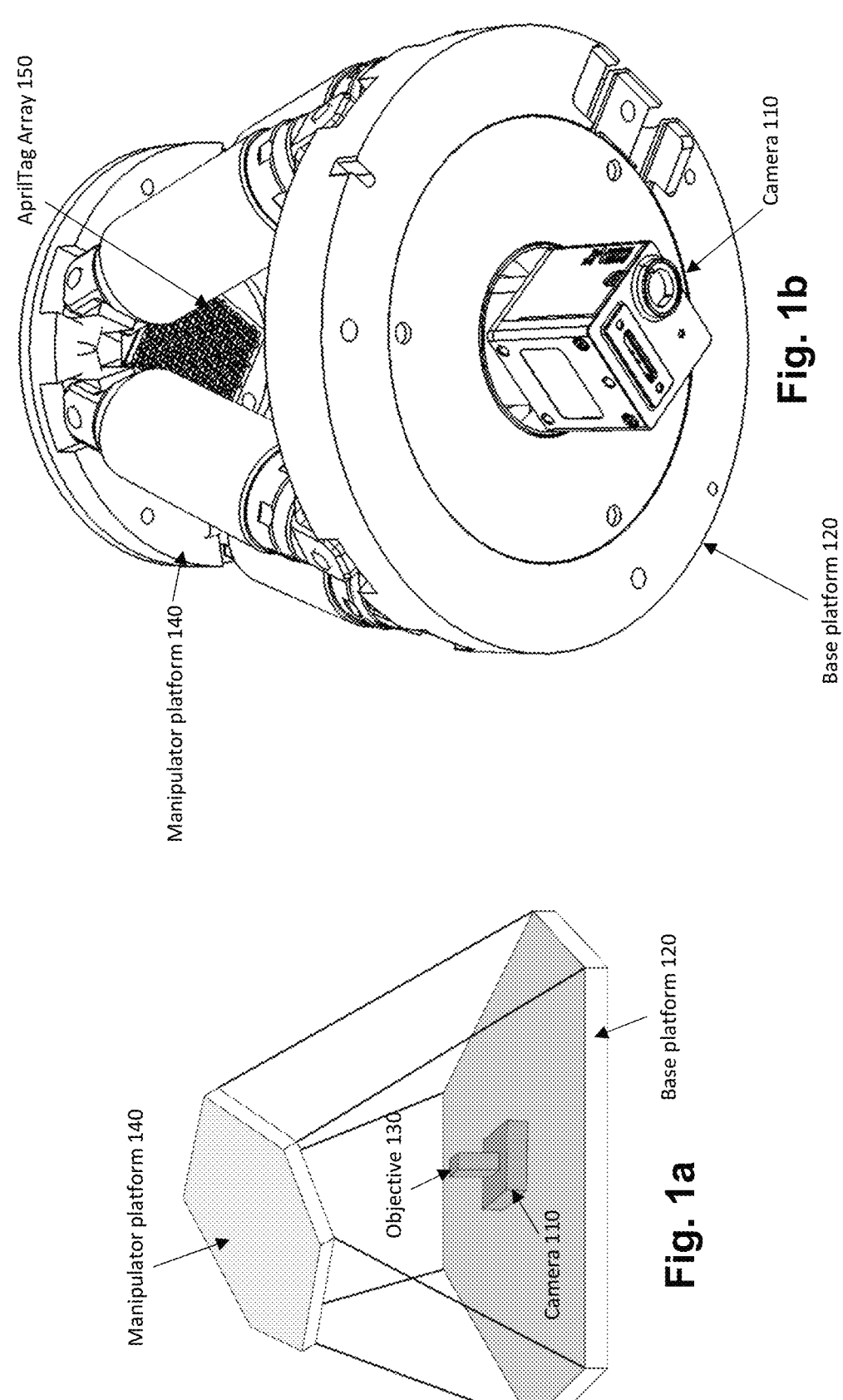
FIGS. 1a and b show schematic three-dimensional representations of an exemplary parallel kinematic system.

The present invention relates to parallel kinematic systems to which markings are attached, as well as to methods for attaching markings to parallel kinematic systems.
Parallel Kinematic Systems A fundamental distinction in robotics technology is made between the main classes of serial and parallel kinematics. There are also hybrid kinematics which represent a combination of serial and parallel kinematics. While serial kinematic systems consist of a series of links (e.g. linear axes and/or rotary axes) to form an open kinematic chain, parallel kinematic systems considered in the present application consist of a number of closed kinematic chains. In practice, parallel rod kinematic systems, rod actuators and/or rotation actuators are frequently used for the parallel axes of motion and couple two planes that move relative to one another. Each drive is therefore directly connected to the (end) effector (e.g. a tool carrier). This means that the drives are not loaded with the masses of all the subsequent links and drives, as is the case with serial kinematic systems. Since all drives are therefore moved simultaneously, i.e. parallel to each other, the loads are distributed (more) evenly among all guide elements. The resulting low moved dead weights enable extreme dynamics with high velocities and accelerations while simultaneously having high level of mechanical accuracy. Another difference to serial mechanics is that, with parallel kinematic systems, drives, in particular the motors and gears, remain stationary. This not only optimizes the dynamics and performance of such robots, but also their energy balance. Parallel kinematic systems are therefore often used when simple motion sequences with a high level of repeatable accuracy and speed are demanded. Typical examples of parallel kinematic systems are hexapods and delta robots. It is to be noted at this point that the example of a hexapod frequently used in the present application is merely illustrative and what has been said generally also applies to other parallel kinematic systems.

EMBODIMENTS

According to an embodiment of the present invention, a parallel kinematic system is provided. As shown by way of example in FIGS. 1, 2a and 2b, the parallel kinematic system comprises a camera 110 which is configured up to observe a marking region 150 of the parallel kinematic system that moves along with a pose of the parallel kinematic system. The parallel kinematic system further comprises mutually distinguishable markings which are attached to the parallel kinematic system in marking region 150.

The markings in the marking region are either:

attached at a distance D between any two markings that are adjacent in a direction that satisfies the formula $$\frac{FOV_{min} - (n+2)*t_m}{n+1} < D \le \frac{FOV_{min} - (n+1)*t_m}{n},$$

where the pose of the parallel kinematic system can be determined based on an image of the marking region captured with camera 110 if the image contains at least a number n of any of the markings in the direction, where n is greater than or equal to 1; or attached in different planes, where a distance D between any two markings that are attached adjacent in a direction satisfies the formula $$D \le \frac{FOV_{min} - (n+1)*t_m}{n},$$

and the pose of the parallel kinematic system can be determined based on an image of the marking region (e.g. of any or each individual one) captured by the camera if it contains at least a number, n of any of the markings in the direction, where n is greater than or equal to 2; or As explained in more detail below, $t_m$ there denotes the length of one of the markings, and $FOV_{min}$ denotes a length of the minimum field of view of camera 110.

Figure 3:
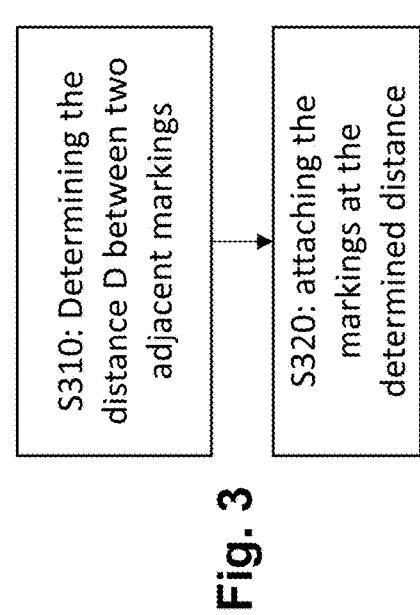
FIG. 3 shows a flowchart showing exemplary steps for attaching markings in the marking region.

According to another embodiment, a method for attaching mutually distinguishable markings to a parallel kinematic system in a marking region is provided accordingly. Such a method is shown in FIG. 3 and comprises a step S310 of determining a distance in accordance with either the formula $$\frac{FOV_{min} - (n+2)*t_m}{n+1} < D \le \frac{FOV_{min} - (n+1)*t_m}{n};$$

or the formula $$D \le \frac{FOV_{min} - (n+1)*t_m}{n}.$$

The method further comprises a step S320 of attaching markings that are respectively adjacent in a direction at determined distance D so that the pose of the parallel kinematic system can be determined based on an image of the marking region captured by a camera if at least a predetermined number, n, of markings in the image is disposed in the direction. In other words, if a (any) captured image contains at least the predetermined number, n, of markings in the direction, the poses can be determined based on the image. In general, the markings in step S320 of attaching can be attached in different planes, in particular when n is greater than or equal to 2 and/or the second of the two formulas above, i.e.

$$D \le \frac{FOV_{min} - (n+1) * t_m}{n}$$

is used.

By directly determining the position or pose of the movable work platform by way of markings, it is no longer necessary to solve the forward kinematics in a complex manner using numerical methods (relief of the controller, higher bandwidth, however, depending on the frame rate and the required identification time). Furthermore, influences such as offset, deformation, play and backlash can be detected in the legs, the links or the movable platform itself. Determining the absolute position is possible so that reference travel can be dispensed with. The possibility of directly regulating the position of the movable work platform and not, as was previously the case, just the driven links (e.g. only the lengths of the legs on a hexapod) furthermore arises. Furthermore, only one sensor (camera) is used for measuring 6 degrees of freedom so that the complicated alignment of several sensors can be dispensed with. In particular, it is possible for only one sensor image, i.e. one sensor signal, to be used, which further simplifies pose determination. Since at least one marking (or the required minimum number) is visible in every pose of the parallel kinematic system, such direct measurement can achieve a high level of accuracy when determining the pose in the entire work region of the robot.

It is to be noted that the following detailed description relates equally to the parallel kinematic system according to the invention as well as to the attachment method according to the invention.

Camera

In general, parallel kinematic systems according to the invention can comprise a camera. However, the present invention is not restricted thereto, since parallel kinematic systems according to the invention can also comprise no camera. A parallel kinematic system can comprise, for example, only one attachment location, attachment device, and/or attachment bracket to which a camera can be attached according to the invention (i.e., for example, it can be attached such that the camera is directed towards the marking region). It is also possible that a parallel kinematic system is only provided to be used together with a camera (having a specific focal distance) standing in a specific location and is directed towards the marking region.

It is also to be noted that the term camera is presently to be understood broadly and comprises all devices for optical image capture, in particular cameras with and cameras without optics (e.g. a "pinhole").

Furthermore, the camera can comprise a suitable objective (possibly including an intermediate ring) which can be screwed onto the camera, for example, for focusing the camera onto the movable work platform. The term camera also includes such a possibly exchangeable objective. If, for example, the focal distance of the camera is mentioned in the present application, this can comprise or be the focal distance of an optical system and/or of an objective. The same applies to the other camera parameters presently used.

Furthermore, the camera can include one or more intermediate rings with which the distance to the focal plane is shortened. Shortened working distance g' can be calculated using the following equations:

$$g'_{fp} = \frac{1}{\dfrac{1}{f} - \dfrac{1}{b+zr}}$$

$$b = \frac{1}{\dfrac{1}{f} - \dfrac{1}{g_{fp}}}$$

where zr denotes the width of the intermediate ring.

The camera is configured to observe the marking region in different or even all possible poses of the parallel kinematic system. The camera and the marking region can, but do not have to be, attached in such a way that the marking region can be observed in all possible poses. For example, it may not be intended to actually approach certain theoretically approachable poses and/or to determine them precisely using the markings. In particular, it can be that pose determination based on the markings and the camera should only be carried out for poses of a specific work region. This can be, for example, the work region for carrying out a specific work/task (or a specific part of a work/task) for which particularly precise pose determination is necessary.

"Observe" is here means that the camera is or can be directed towards the marking region, for example, can capture images thereof. These images can be used to determine the pose of the kinematic system, as is further explained below. It is to be noted that this does not mean that the camera always has to have the entire marking region in the field of view. For example, as explained in more detail below, the camera can have only a section of the marking region in the field of view.

The camera can be attached, for example, in or to a base of the parallel kinematic system. The base can be, for example, a base plate or platform of the kinematic system or of the hexapod, respectively, in/to which the camera can be attached and/or fixed. The camera can be directed towards the underside of the work platform, in particular if the marking region is located there.

Figure 2B:
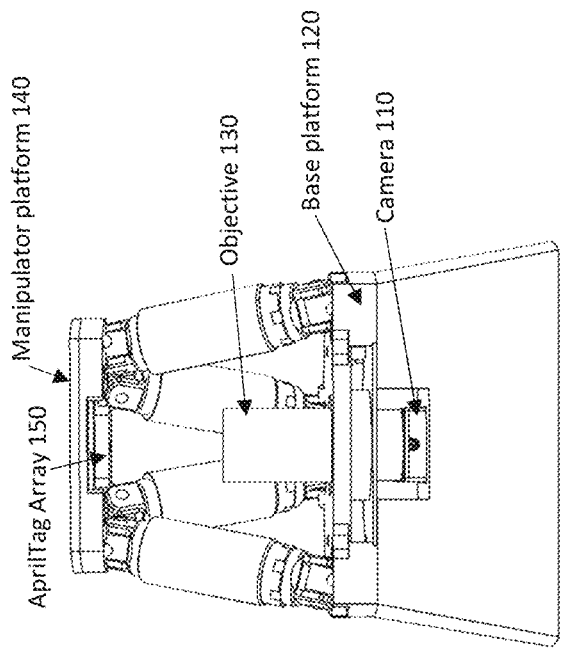
FIGS. 2a and b show schematic sectional representations of an exemplary parallel kinematic system.
Figure 2A:
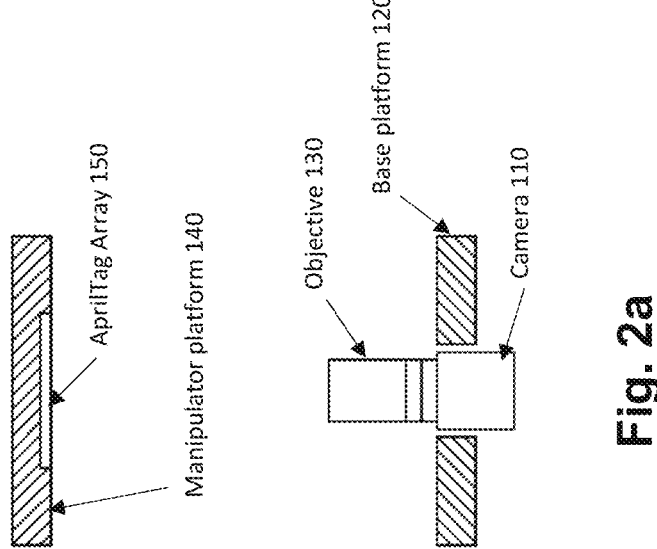

This is also illustrated in FIG. 1 as well as in FIG. 2a and FIG. 2b. As can be seen there, camera 110 is installed in base platform 120 and is directed towards the underside of manipulator platform 140 on which AprilTag array 150 is also disposed. It should be noted again at this point that lens 130 can also be regarded to be part of camera 110.

The camera can then be aligned in such a way that it is disposed perpendicular to the movable platform (or the marking region) in a zero position or "home position" of the hexapod. The zero position can be in particular a pose in which the movable work platform is parallel to the base plate. Alternative positioning and/or orientation of the camera is also possible, as long as the marking region can then be observed by the camera in different poses (or even in all possible poses).

As explained below in the description of the attachment location of the marking region, if the position of the camera and the marking region are "swapped", the camera can also be attached to a location that moves along, e.g. on the end effector, in particular on the underside of the work platform. Field of View, Minimum Field of View $FOV_{min}$, and Maximum Field of View $FOV_{max}$ The field of view (the abbreviation "FOV" presently used is derived from the English term "field of view") presently refers to the region that is captured by the camera. It has the same shape as the corresponding sensor of the camera. For the sake of simplicity and clarity of description, only the case of a rectangular and/or square sensor shall explicitly be described hereafter, but the invention is not restricted to such.

In the case of a rectangular sensor, the field of view has the same aspect ratio as the sensor, and arises from $$FOV_x = \left(\frac{g}{f} - 1\right) * Sensor_x$$

and $$FOV_y = \left(\frac{g}{f} - 1\right) * Sensor_y,$$

where f denotes the focal distance of the camera, $FOV_x$ denotes the width of the field of view, $FOV_y$ denotes the height of the field of view, $Sensor_x$ denotes the sensor width, and $Sensor_y$ denotes the sensor height. The field of view therefore corresponds to the region or section of the marking region that the camera can observe at a certain distance of the camera from the marking region. A larger sensor can therefore "capture" a larger field of view at the same working distance or object distance g, respectively. In other words, the dimensions of the sensor are scaled with the inverse aspect ratio $$1 \Big/ \frac{b}{g} = \left(\frac{g}{f} - 1\right)$$

in order to obtain the field of view (b, as usual, denotes the image distance and 1/f=1/b+1/g is true).

In order to ensure that one or more markings are always in the field of view, the minimum field of view can be used when determining the marking distances explained further below. According to the above formulas, the minimum length of the field of view is $FOV_{min}$ $$FOV_{x,min} = \left(\frac{g_{min}}{f} - 1\right) * Sensor_x$$

and $$FOV_{y,min} = \left(\frac{g_{min}}{f} - 1\right) * Sensor_y.$$

The distance $g_{min}$ there, also referred to as the minimum distance, is the minimum, i.e. shortest, distance among the distances that the marking region can be away from the camera. The minimum distance $g_{min}$ therefore corresponds to the minimum object width of the marking region that moves along, which can be achieved by changing the pose (in other words, by moving the robot) within a certain region of the pose space, which may be restricted due to the application. $g_{min}$ therefore does not have to be the actual shortest minimum distance if, for example, it is not intended to actually approach certain theoretically approachable poses and/or to determine them precisely using the markings. In other words, the minimum distance can be the shortest distance for which the pose determination is to be carried out based on the markings and the camera. In particular, it can be the minimum working distance, i.e. the minimum distance for carrying out a specific work/task for which precise pose determination is necessary.

The lengths $FOV_{x,min}$ and $FOV_{y,min}$ are accordingly the width and height, respectively, of the section of the marking region that falls into the field of view of the camera at a minimum distance of the camera from the marking region. In addition to the sensor width and height, the minimum field of view of the camera is defined by the focal distance f, which is given, for example, by the objective used and the minimum distance of the marking region from the camera.

In particular if the sensor is square and/or if the marking region can rotate relative to the sensor due to pose changes, it can also make sense to only work with a length $FOV_{min}$ of the minimum field of view. In other words, the length of the minimum field of view, i.e. the length of the section of the marking region that falls into the field of view of the camera at a minimum distance of the camera from the marking region, can also be determined using the following formula $$FOV_{min} = \left(\frac{g_{min}}{f} - 1\right) l_{Sensor},$$

where for $l_{Sensor}$, the shorter of the two lengths $Sensor_x$ and $Sensor_y$ should be selected. In other words, $FOV_{min}$ corresponds to the shorter (or one not longer) of the two lengths $FOV_{x,min}$ and $FOV_{y,min}$.

For reasons of simplicity, the case of only a minimum length $FOV_{min}$, i.e. the case of a square sensor, shall often be considered hereafter. However, it should be noted that what is stated below for $FOV_{min}$ also generally applies to $FOV_{x,min}$, and $FOV_{y,min}$. In other words, $FOV_{min}$ can be $FOV_{x,min}$, $FOV_{y,min}$, or be the shorter of the two lengths (unless it is clear from the context that this is not the case). The same applies to $l_{Sensor}$ regarding $Sensor_x$ and $Sensor_y$.

In analogy to the minimum field of view, the dimensions of the maximum field of view, which is the field of view at the maximum working distance $g_{max}$, can be determined by $$FOV_{x,max} = \left(\frac{g_{max}}{f} - 1\right) * Sensor_x$$

and $$FOV_{y,max} = \left(\frac{g_{max}}{f} - 1\right) * Sensor_y.$$

The maximum working distance $g_{max}$ there is a maximum distance among the distances that the marking region can be away from the camera due to pose changes. Similar to the minimum distance above, this is the maximum distance of the marking region from the camera when the robot moves.

If the sensor is square and/or the marking region can rotate relative to the sensor due to pose changes, then $$FOV_{max} = \left(\frac{g_{max}}{f} - 1\right) L_{Sensor}$$

can be used, where the longer of the two lengths $Sensor_x$ and $Sensor_y$ must be selected for $L_{Sensor}$.

Marking Region

In general, the marking region can be positioned such that it moves along with the pose of the kinematic system. The marking region can be, for example, attached to the end effector, the position and orientation of which is described by the pose. In the case of a hexapod, the marking region can therefore be located in particular on the movable work platform, for example, in and/or symmetrically around the center of the work platform. In particular, if the camera is attached to or provided in a base plate of the hexapod, the marking region can be attached to the underside of the work platform of the parallel kinematic system (attachment method).

The marking region can be, for example, first created on a separate additional plate. This additional plate can then be attached to the work platform (e.g. screwed on) so that it is visible from below through the aperture.

It is to be noted at this point that in the present application only the case of a fixed camera and a marking region that moves along therewith is mostly explicitly described as an illustrative example. However, the present invention is not restricted to a marking region moving along. More precisely, it is possible to swap the position described (i.e. the attachment location) of the camera and the marking region. For each embodiment of the present invention explicitly described here, there is therefore also a corresponding further embodiment in which the position of the camera and the marking region are swapped and to which the present invention also relates. The camera is then moved along and the marking region is stationary. It is therefore possible, for example, that the marking region is attached to the base of the parallel kinematic system (and therefore does not move) and the camera is attached to the underside of the work platform of the hexapod (and therefore moves along therewith).

It is also to be noted that the abbreviation ATA (from the English for AprilTagArray) is used for the marking region hereinafter, but this does not necessarily have to refer to a specific arrangement of the markings and/or the use of AprilTags. By using an array of tags, only a small image region (field of view) is required for the camera. This allows for the camera to be placed significantly closer to the work platform, which increases the accuracy that can be obtained.

Dimensions of the Marking Region

The size of the marking region can be matched to the position and/or the field of view of the camera such that the camera always observes a section of the marking region, even when the robot moves within the intended frame.

Figure 4:
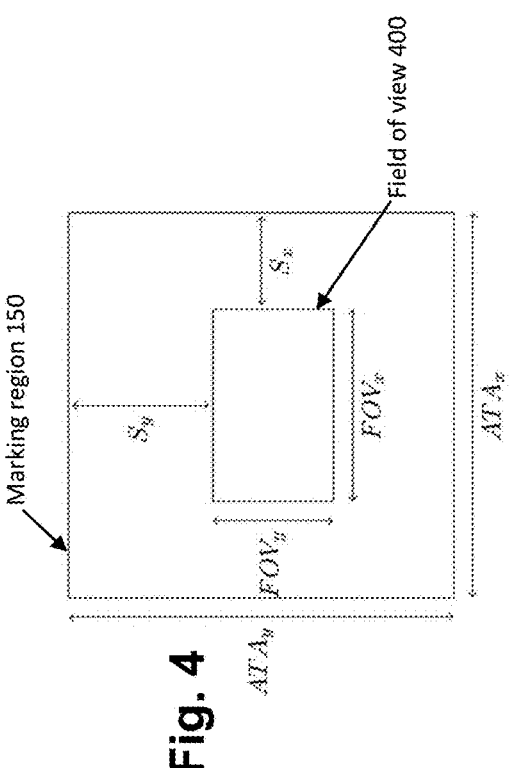
FIG. 4 shows a schematic representation of the visible section of the marking region for changes of the pose of the kinematic system.

This is illustrated in FIG. 4 for a sensor with rectangular dimensions, i.e. a rectangular field of view 400 with width and height $FOV_x$ or $FOV_y$, respectively. As can be seen, the dimensions of marking region 150, i.e. the width and height, are designated as $ATA_x$ and $ATA_y$, respectively. Field of view 400 shown is centered in marking region 150 and corresponds to a specific pose of the robot, e.g. a resting pose, home pose, home position, and/or reference position. As illustrated by the double arrows, marking region 150 can move relative to field of view 400 as the robot moves. $S_x$ there denotes the adjustment range in the x direction, i.e. both to the "right" as well as to the "left", starting from a centered (resting) position of the hexapod, as illustrated. Likewise, $S_y$ denotes the adjustment range in the y direction, i.e. both "upwards" and "downwards". In other words, the considered range of motion of the hexapod in the horizontal and vertical directions is $2S_x$ and $2S_y$, respectively. To ensure that the field of view is always in the region of the ATA during such motions, the dimensions of the ATA can be calculated according to the adjustment ranges of the hexapod. The field of view, which results from the maximum distance $(g_{max})$ to the camera, is used there (designed for the larger field of view, therefore also suitable for the smaller field of view at $g_{min}$. This results in $$ATA_x = FOV_{x,max} + 2 * S_x$$

and $$ATA_y = FOV_{y,max} + 2 * S_y$$

for the horizontal or vertical length of the marking region.

Figure 6:
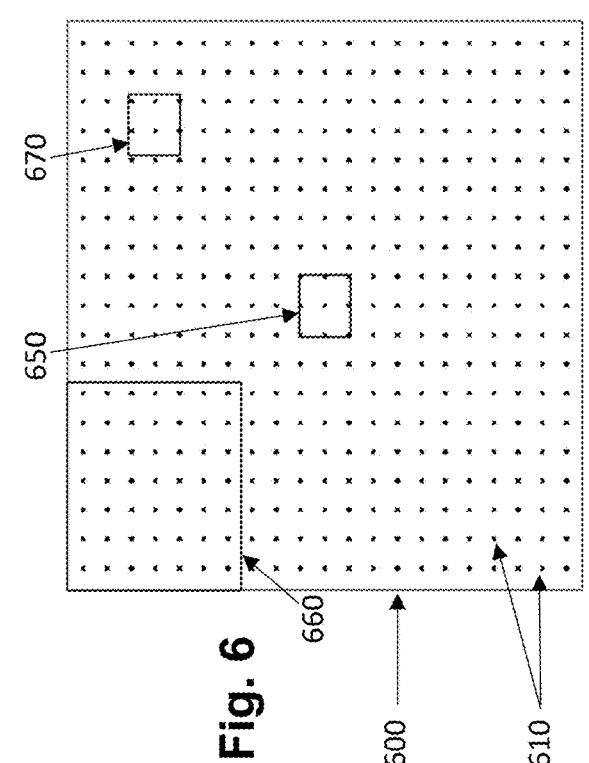
FIG. 6 shows a schematic representation of a minimum field of view at different deflections in the x and y direction as well as a corresponding maximum field of view; The distance of the markings is selected such that at least 4 and, in limit cases, 9 markings are fully visible.
Figure 5:
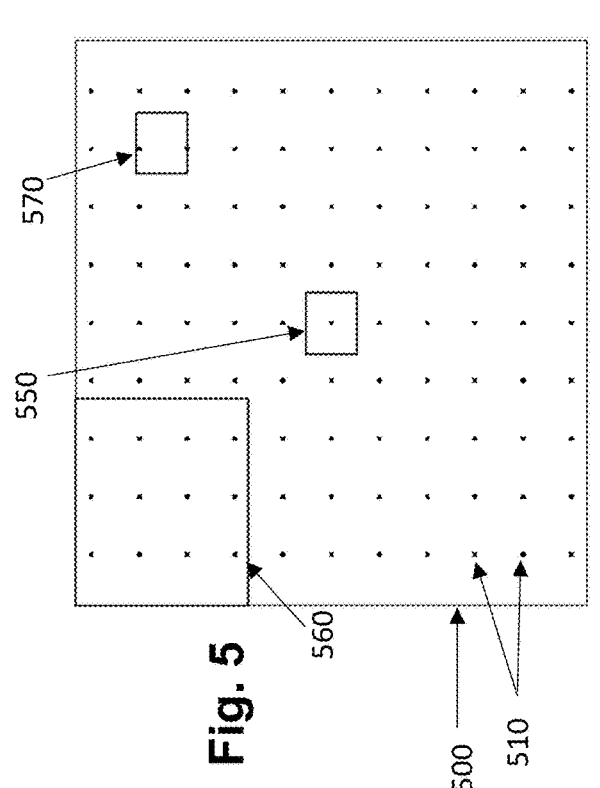
FIG. 5 shows a schematic representation of a minimum field of view of a marking region at different deflections in the x and y direction as well as a corresponding maximum field of view; The distances of the markings is selected such that at least 1 and, in limit cases, 4 markings are fully visible.

The relationships between the minimum field of view, the maximum field of view, the adjustment ranges and the dimensions of the marking region shall now be illustrated again using FIGS. 5 and 6. As can be seen, marking regions 500 and 600, each containing a plurality of markings 510 and 610, respectively, are shown in FIGS. 5 and 6. Marking regions 500 and 600 there differ substantially in the density of the markings or the distances between markings, respectively, which shall be discussed further below.

Furthermore, three regions are marked in FIG. 5 and FIG. 6. Regions 550 and 650 represent a field of view at a minimum distance $g_{min}$ of the camera from the marking field directed towards the center of the marking region. Regions 550 and 650 are therefore from a centered pose without deflection in the direction of the adjustment ranges; the hexapod/robot is at the zero point, e.g. in its resting pose. Regions 560 and 660 represent a corresponding field of view at a maximum working distance $g_{max}$ and maximum deflections $S_x$ and $S_y$ (to the top left). As can be seen, these fields of view are larger than the other fields of view illustrated. For regions 570 and 670, this is ultimately the field of view at the minimum working distance at $g_{min}$ and maximum deflections $S_x$ and $S_y$ (to the top right).

Arrangement of the Markings in the Marking Region

Figure 7B:
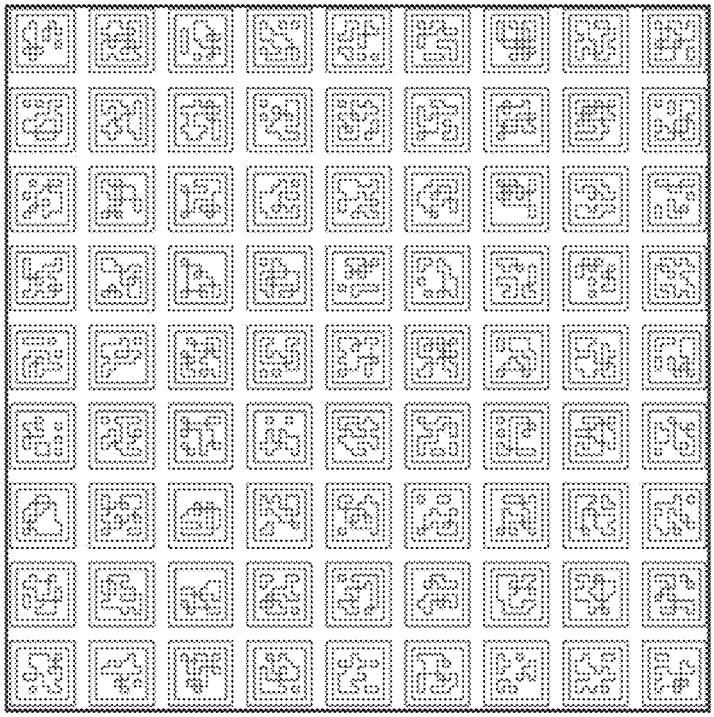
FIGS. 7a and b show schematic representations of marking regions in which the markings are arranged uniformly.
Figure 7A:
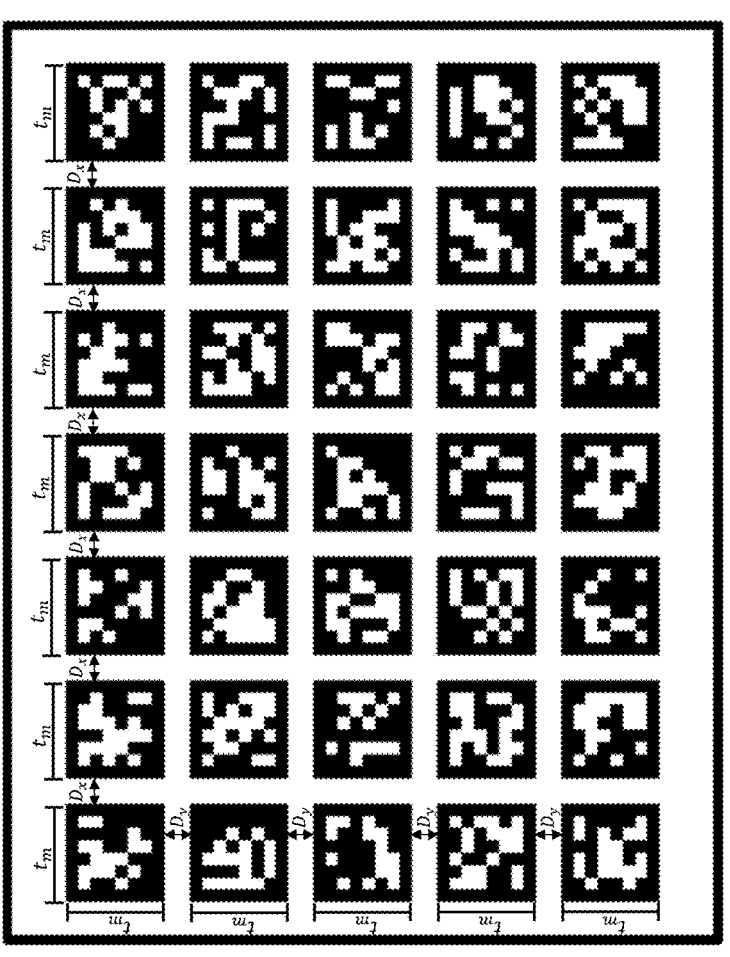

Generally, the marking region contains multiple markings. In particular, the marking region can be an array (a field) of "fiducial tags", e.g. AprilTags. They can be arranged in the marking region according to a regular arrangement pattern. For example, as illustrated in FIGS. 7a and 7b, the markings can be or have been attached in correspondence to the points of a two-dimensional grid, in particular at uniform distances. The marking region can also consist of a grid of markings in which the markings are arranged, for example, on concentric circles around a center point.

What can be important there is that the grid is constructed in such a way and the field of view of the camera (including the lens) is set in such a way that at least one marking or a specific number of markings are always fully visible. The marking region should also be large enough so that at least one marking or the desired number of markings is fully visible even in the extreme positions of the hexapod. To determine the pose, the exact position of each of the markings on the array should additionally be known.

Markings

As already indicated, the parallel kinematic system comprises mutually distinguishable markings (also referred to as tags), or the attachment method comprises a step of attaching the mutually distinguishable markings in a marking region, respectively. What is meant there by mutually distinguishable is that every two markings can be distinguished, i.e. it is possible to uniquely identify a marking based on an image captured by the camera. The last known pose of the kinematic system could also be used for this purpose.

The differentiability between the individual tags (and their known location on the array) makes it possible to infer the exact location (position and orientation) of the moving platform from a single tag.

In general, the markings can be reference markers, such as ARToolKit markings, ArUco markings, QR codes or, in particular, AprilTag markings.

Figure 8:
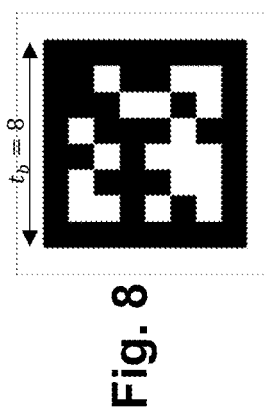
FIG. 8 shows an exemplary marking.

In particular, AprilTags, which are a specific system of reference markers (also known in English as "fiducial tags"), have become particularly popular in robotics. They can be considered to be a special type of QR code and, similar to QR codes, have a specific shape and a specific layout for identification, for error correction, for avoiding false detection, or for ensuring detection in the event of occlusion. However, compared to typical QR codes, AprilTags contain less data and are specifically designed for robust identification at long distances as well as for rapid decoding of their exact position and orientation relative to the camera, which can be particularly beneficial for real-time robotics applications. An exemplary AprilTag is illustrated in FIG. 8.

However, the present invention is not restricted to a special type of markings and/or tags. In general, any type of optical markings can be used as long as the markings are mutually distinguishable and can be used to determine the pose of the kinematic system, as described further below.

Length of a Marking

The length of one of the markings is denoted by $t_m$ in the present application. $t_m$ there denotes an actual length, it can therefore be specified, for example, in meters or millimeters. In general, all markings can have the same length $t_m$ and be square. However, the present invention is not restricted to this. The markings can also be, for example, rectangular and/or not actually use the entire region of a rectangle, for example, if they are round.

Furthermore, $t_b$ denotes the number of information units of the marking in the direction of length $t_m$. For example, $t_b$ denotes the number of bits that are coded next to each other in the direction in which also length $t_m$ is measured. While $t_b$ represents the width and/or height of a marking in bits, for example, $t_m$ represents the "real" width and/or height of the marking. In contrast to $t_m$, size $t_b$ is unitless or dimensionless, respectively. Here as well, it is again assumed for reasons of simplicity that the markings are constructed in a square manner, i.e. the number of bits $t_b$ is the same in both directions that define the respective square.

The term information units refers to individual regions from which the marking can be constructed and which can each encode information. The markings can consist of, for example, several squares, as shown in FIG. 8, where the squares correspond to the information units and a bit can be encoded in each square. A unit of information can therefore correspond to a single bit or square of an AprilTag. However, the present invention is not restricted to this. For example, it is possible to encode more than one bit of information in one unit, for example, in that colors and/or different heights are used.

For the markings to be easily recognized, length $t_m$ of a marking can be determined according to the following equation:

$$t_m \geq px * p * t_b * \left( \frac{g_{max}}{f} - 1 \right)$$

Where pixel length px denotes the length of the sensor, which corresponds to a sampling value from the camera. px is the pixel size of the camera, e.g. in meters, If, for example, the sensor has the length $Sensor_x$ in the x direction and the number of sampling values or of pixels in the x direction is denoted by $N_p x$, then pixel length ($Sensor_x$ denotes the length of the camera sensor in the x direction, as explained above):

$$px = Sensor_x / N_{px}$$

$N_{px}$ corresponds to the image resolution in the x direction (i.e. the number of pixels in the x direction) and a smaller px value corresponds to a higher resolution of the camera. For a non-square sensor, one would have a similarly defined pixel length py in the y-direction and also a separate $t_m$ and $t_b$ for the y-direction. However, it is also possible that the pixel lengths in the x and y directions (px=py) are equal, even if the sensor dimensions in the x and y direction are different ($Sensor_x \neq Sensor_y$). For the sake of simplicity, it is assumed hereafter that the pixels of the camera are square, so that at least px=py applies.

Variable p corresponds to the desired minimum number of sampling values per unit of information according to the Nyquist-Shannon sampling theorem and is preferably 5. In general, however, p can be selected differently in dependence of on the camera and/or application, but is typically greater than or equal to 2 and less than or equal to 5. For example, for a monochrome camera, p=2, and for an RGB camera, however, a value p=3 to 4 can be more suitable.

If the minimum size of an AprilTag $t_m$ is thus determined, the AprilTags can still be detected sufficiently well at any distance less than or equal to maximum working distance $g \leq g_{max}$.

Distance D Between Markings

In general, it is possible to determine (e.g. calculate) the density of tags based on the specification of the "desired number" of tags that should at least always be visible, as well as the given system parameters, in particular the focal distance. Such a "desired" or predetermined number is referred to in the present application as "n" (or as $n_x$ and $n_y$ if an explicit distinction is made between the x and y direction) and can generally be any integer greater than or equal to 1 (e.g. n=1, n=2, etc.). In general, $n_x$ and $n_y$ can be equal or different. The desired minimum number of tags in the image is therefore n*n or, if a distinction is made between the x and y direction $n_x*n_y$.

For example, it can be sufficient that n of the markings can be seen in one direction (e.g. x or y direction) in an image of the marking region in order to determine the pose of the kinematic system based on this image. In particular, the number n of markings can correspond to the number of markings that must at least be visible in an image of the marking region in one direction (e.g. x or y direction) in order to determine the pose of the kinematic system. In other words, n can be the minimum number of markings necessary (and sufficient) so that the pose can always be determined based on an image that has n markings in the direction under consideration. "Always" is presently to be understood to mean that a sufficient number of markings must of course also be visible in the other direction (which can be a different number of markings than the number in the direction under consideration).

For example, $n_x$ and $n_y$ can be the minimum numbers of markings that must be visible in an image in the x and y direction, respectively, for the pose to be determinable based on that image. The pose can then always be determined if there are both (i) $n_x$ markings in the x direction as well as (ii) $n_y$ markings in the y direction in the image. The word "sufficient" in this context therefore refers to the direction under consideration and does not mean that it can not also be necessary for a certain number of markings to be visible in the other direction. Likewise, the statement that the pose can always be determined if $n_x$ markings are visible in the x direction means that this is possible if $n_y$ markings are not also visible in the y direction.

It can therefore be the case that, if there are fewer than n markings in an image, the pose can no longer be uniquely determined (at least not for an image captured in any pose). However, the present application is not restricted to such a "minimal" n. For example, the number n can also be larger than is theoretically necessary for determining the pose of the kinematic system, for example, to improve the reliability/robustness of the detection. The number n can be, for example, predetermined by the selection of markings used or can be determined based on the selection of markings.

For example, the distances, $D_x$ and $D_y$, between adjacent tags in the x and y direction can be calculated based on a specification of the desired number of tags that should always be fully visible at least in the x and y direction, respectively. The markings can be arranged, for example, having uniform spacings $D_x$ and $D_y$ in the x and y direction, respectively, as indicated in FIG. 7a. The term adjacent then refers to the closest marking in the x or y direction.

Due to the visibility of at least the desired number of markings (e.g. one), the position of the movable platform of the hexapod can be detected for each pose to be approached. At the same time, the long distances presently described allow, for example, fewer different markings to be used and/or for the number of markings that are on a single image captured by the camera to be reduced. This can simplify and speed up the detection/identification of the marking in an image and the determination of the pose.

First of all, it is to be noted that, even if each of the distances $D^{max}$, $D_x$, $D_y$ and $D_y$ is not explicitly mentioned hereinafter, what is stated applies in the same way, i.e. analogously, for the distances $D^{max}$, $D_x$, and $D_y$ between markings. For example, a distinction can be made between $D_x$ and $D_y$ if neither the marking region rotates relative to the camera nor the sensor dimensions are square. For a square sensor, $D_x = D_y = D$, and if relative rotations are possible, the shorter of the two distances $D_x$ and $D_y$ would need to be used (and, as explained in more detail below, divided by $\sqrt{2}$).

For example, the desired number $n_x$ of tags per row (horizontally arranged tags, "x-direction") and the desired number $n_y$ of tags per column (vertically arranged tags, "y-direction") can be specified. In order to ensure that the desired number of tags ($n_x$ and $n_y$) is always in the field of view of the camera, the distance $D_x$ between the tags in the x direction and the distance $D_y$ between the tags in the y direction can be calculated based on this according to:

$$D_X \leq D_x^{max} = \frac{FOV_X - (n_x + 1) * t_m}{n_x}$$

$$D_y \leq D_y^{max} = \frac{FOV_y - (n_y + 1) * t_m}{n_y}$$

There will therefore be $n_x * n_y$ AprilTags in the viewing region. Since the field of view increases as the working distance increases, the field of view at 9 min can be used for the calculation. More precisely, $FOV_{x,min}$ and $FOV_{y,min}$ are used for $FOV_x$ and $FOV_y$, respectively. It is noted that $FOV_{x,min} \geq (n_x + 1) * t_m$ and $FOV_{y,min} \geq (n_y + 1) * t_m$ are to apply so that non-negative distances $$D_x^{max} \text{ or } D_y^{max}$$

result. The above maximum distances can ensure the desired minimum number over the entire work region. At the same time, relatively large distances are made possible, which makes it easier to identify the individual markings and saves computing time.

In particular, if it is sufficient for only one marking to be fully visible at any time, the distance D (D presently stands in particular for $D_x$ and/or $D_y$) between any two adjacent markings in the region $$(FOV_{min} - 3t_m)/2 < D \leq FOV_{min} - 2t_m$$

can be selected. This allows for a large tag spacing to be used, where at least one tag is still sufficiently visible.

Limit Case—Increase $$D^{max}(D_x^{max}, D_y^{max})$$

Figure 9:
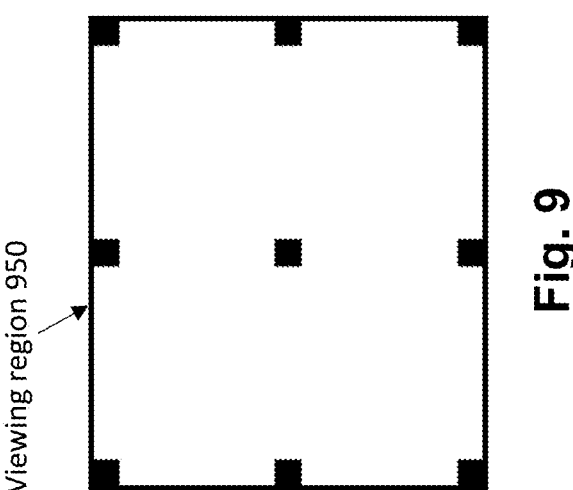
FIG. 9 shows the viewing region of a marking region in which in the limit case there are more (i.e. $(n_x+1)=(n_y+1)=3$ in the x or y direction) than the desired minimum number $n_x=n_y=2$ of n markings fully visible in the x- and y direction.

If the distances $D_x$ and $D_y$ are determined as described above, then there is the limiting case that more than $n_x * n_y$ tags are fully visible, more precisely it can be possible that up to $(n_x + 1) * (n_y + 1)$ tags can be fully visible. This is illustrated in FIG. 9 for the case $n_x = n_y = 2$. As can be seen, nine tags are fully visible, i.e. they are completely in viewing region 950. The limit case presently refers to the transition of columns or rows of tags from the field of view (e.g. when a new row has just been pushed in on one side but the row on the other side has not yet started to push itself out again).

Figure 10:
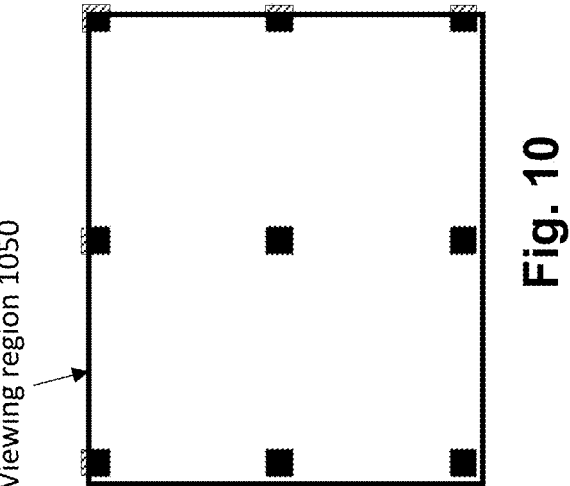
FIG. 10 shows a viewing region that is shifted by a small deflection to the bottom left compared to the viewing region in FIG. 9; This means that only $n_x=n_y=2$ markings are again fully visible in the x and y direction.

As illustrated in FIG. 10, this is already no longer the case with minimal displacement, i.e. with a small displacement (in the x and y directions) $n_x * n_y$ tags are again only visible, i.e. in the example under consideration there are only four tags fully visible, i.e. they are disposed completely in viewing region 1050.

Since the camera typically has a finite resolution, this limit case can be exploited to increase the maximum distances $$D_x^{max} \text{ and } D_y^{max},$$

and thereby also $D_x$ and $D_y$, by one pixel size px each. It then arises that $$D_X \leq D_x^{max} = \frac{FOV_{X,min} - (n_x + 1) * t_m}{n_x} + px\left(\frac{g_{min}}{f} - 1\right)$$

$$D_y \leq D_y^{max} = \frac{FOV_{y,min} - (n_y + 1) * t_m}{n_y} + py\left(\frac{g_{min}}{f} - 1\right)$$

The distance between the markings is therefore displaced by the shortest possible resolvable distance, namely px or py.

In purely geometric terms, this means that there are always $n_x*n_y$ tags (fully) disposed in the field of view, since the others are not fully disposed in the field of view.

A better camera (with a smaller pixel size px or py) prevents a possible increase in the distances between the Apriltags $D_x$ or and $D_y$. Adding the px and the py term to the above formulas results in that, in the limit case, multiple visible tags are pushed apart by exactly one pixel, so that exactly one pixel-wide row of one of the two edge tags is missing and that it is no longer fully visible. The better the camera, the smaller a resolved pixel is and the closer the tags should be to each other if only one pixel of an edge tag is to be missing in a limit case. This means that a denser array is required to fully utilize the higher resolvable level of accuracy of a better camera. It should be noted that what has just been stated applies to a (pre)determined marking length $t_m$. If the latter is adapted to the better resolution (smaller px or py), smaller tags can also be used when employing a better camera, i.e. according to the above formula $$t_m = px * p * t_b * \left( \frac{g_{max}}{f} - 1 \right),$$

where now the shorter pixel length px or py of the better camera is used. In particular, by inserting the px-dependent expression for $t_m$ into the above formula for the distances $D_x$ and $D_y$, it can be seen that the distances can typically be increased by a smaller pixel size if marking length $t_m$ is adapted accordingly to the better camera.

On the other hand, it is also possible to use this better resolution of the camera to increase the distances between the markings. In general, an information unit has the length $t_m/t_b$, and a sampling value at the distance g of the marking from the camera corresponds to the length $$px * \left( \frac{g}{f} - 1 \right).$$

Therefore, for the working distance g, $$P(g) = \frac{t_m}{t_b * px} \left( \frac{f}{g - f} \right)$$

sampling values of an information unit are captured by the camera. As can be seen, using a camera with a smaller px results in an increase in the number of sampling values taken P. In general, if the minimum number of sampling values taken $Pg_{max}$ is greater than the predetermined minimum number p, then the markings can be made smaller, whereby P becomes smaller and/or the distances between the markings can be made longer. In particular, if the distances are to be made longer (P−p) sampling values at each of the two information units at the edge can be dispensed with. The distance between the markings can therefore be increased e.g. to $$D_X \leq D_x^{max} = \frac{FOV_{X,min} - (n_x + 1) * t_m}{n_x} + (2P(g) - 2p + 1) * px * \left( \frac{g_{min}}{f} - 1 \right)$$

For P(g), e.g. $P(g_{max})$ can be used in a conservative manner. However, since $n_x$ markings will generally not all be fully visible at the minimum working distance, $P(g_{min})$ can also be used there.

If the distance or the maximum distance is further extended to $$D_X = D_x^{max} = \frac{FOV_x - (1 - n_x) * t_m}{n_x}$$

Then $(n_x-1)*(n_y-1)$ are fully visible in the limit case. One row of markings has already pushed itself out of the field of vision, while the next row has not yet begun to push itself into the field of vision. In the limit case, fewer and not more markings can now be seen; For $n_x=n_y=2$, with such an extended distance, only one tag would be visible in the limit case.

Figures 11A, 11B:
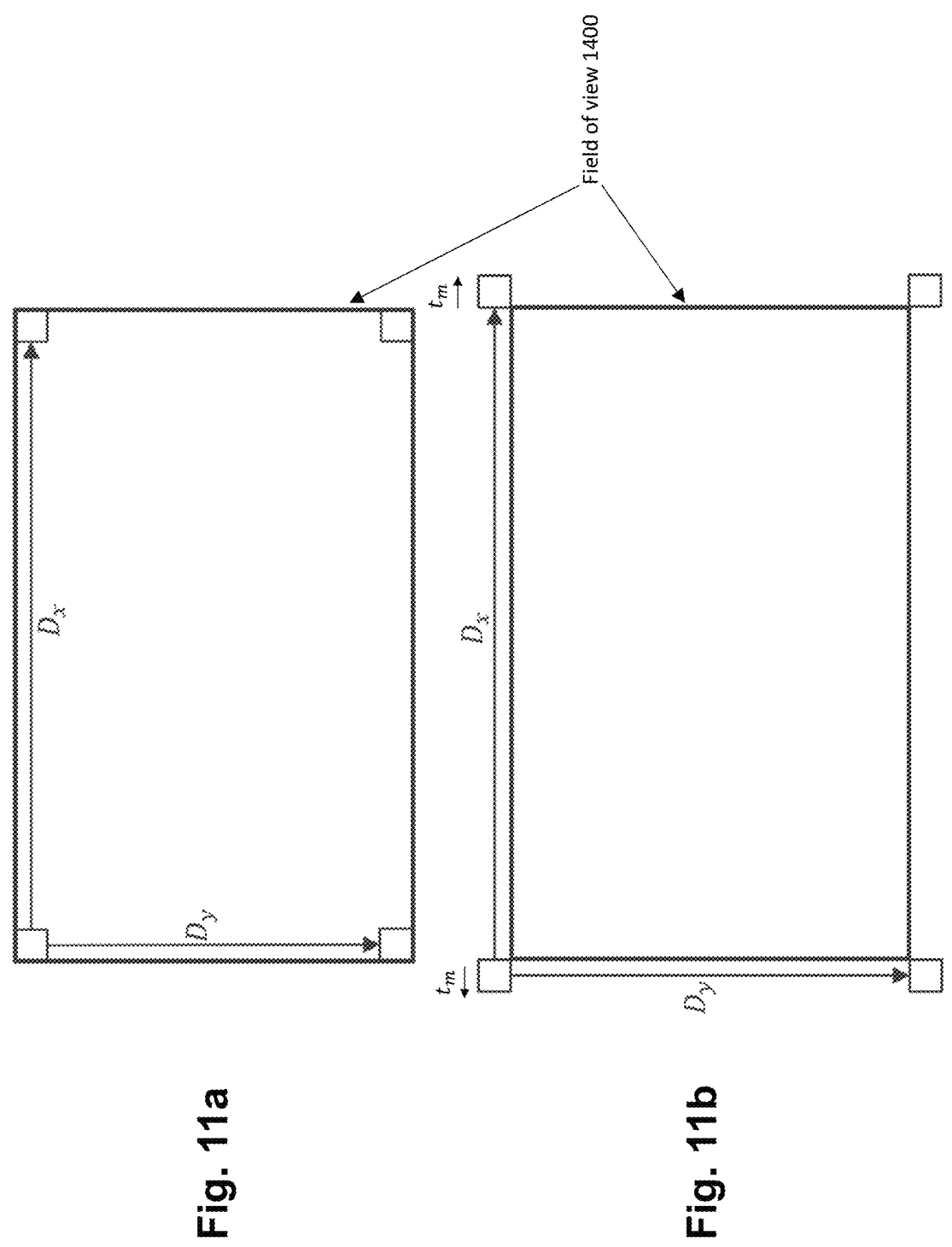
FIG. 11a shows the viewing region of a marking region in which in the limit case there are more (i.e. a total of 4) than the desired minimum number $n_x=n_y=1$ of markings fully visible in the x and y direction.
FIG. 11b shows the viewing region from FIG. 11a after an increase of the distances between the markings in the x and y direction by $2t_m$, which means that in the limit case no marking is fully visible any more.

In general, it can also be that it is not necessary to fully view a tag in order to identify it and/or determine its location. As illustrated in FIGS. 11a and 11b, distance $$D_x^{max}$$

there moves in the region (between the limits)

$$\frac{FOV_X - (n_x + 1) * t_m}{n_x} \leq D_x^{max} < \frac{FOV_x - (1 - n_x) * t_m}{n_x}$$

More specifically, in FIG. 11a, $D_X$ is set equal to the lower limit in the above formula (corresponding to the left side), and in FIG. 11a it is set equal to the upper limit (corresponding to the right side). Field of view 1400 in FIGS. 11a and b has the same size and only the distance between the markings has been changed. As indicated in FIG. 11b, the range in which $$D_X = D_x^{max} \text{ or } D_y = D_y^{max}$$

changes has a length of $2t_m$. The limits of the rang represent the limit cases in which either $(n_x+1)$ tags can be seen (lower limit, corresponding to the left-hand expression of the above equation), or $(n_x-1)$ tags can be seen (upper limit, corresponding to the right-hand expression of the above equation). In particular, if $n_x=n_y=1$ was selected for the upper limit, no tag would be fully visible.

In general, at least $n_x \cdot n_y$ tags are always fully visible at the lower limit, and more tags are fully visible, namely up to $(n_x+1) \cdot (n_y+1)$, in the limit case. At the upper limit, at most $n_x \cdot n_y$ tags are fully visible. This means that fewer tags are fully visible in the limit case, namely up to $(n_x-1) \cdot (n_y-1)$.

For example, if $n_x=n_y=3$ is selected and the distance corresponding to the lower limit is used, then at least $n_x \cdot n_y=3 \cdot 3=9$ tags are always fully visible in the field of view. In the limit case, i.e. at certain poses, more than 9 tags ae fully visible (up to 16). If the distance corresponding to the upper limit is used for the same selection of $n_x$, $n_y$, then a maximum of 9 tags are fully in the field of view, but in the limit case fewer than 9 tags (up to 4).

Therefore, if it is not necessary to fully see a marking to identify it and/or determine its position, then the distance $$D_x^{max}$$

can be increased by up to almost $2t_m$. In other words, if it is sufficient, for example, to see only the fraction $0 < R \leq 1$ of a tag, then the distance between the tags can be determined according to $$D_X = D_x^{max} = \frac{FOV_X - (n_x + 1) * t_m}{n_x} + 2t_m(1 - R)$$

Accounting for Rotations

If the marking region can rotate relative to the sensor, the shorter of the two lengths of the field of view $FOV_x$ and $FOV_y$ is used. Furthermore, a distinction should no longer be made between $D_X$ and $D_y$. The same distance $D=D_X=D_y$ is then used for the horizontal and vertical direction. The distance can be determined according to any of the above formulas, but in order to take rotations into account, it is then divided by $\sqrt{2}$, i.e. reduced in size. Overall, this results in $$D \leq \min\{D_x^{max}/\sqrt{2}, D_y^{max}/\sqrt{2}\}$$

Figure 12:
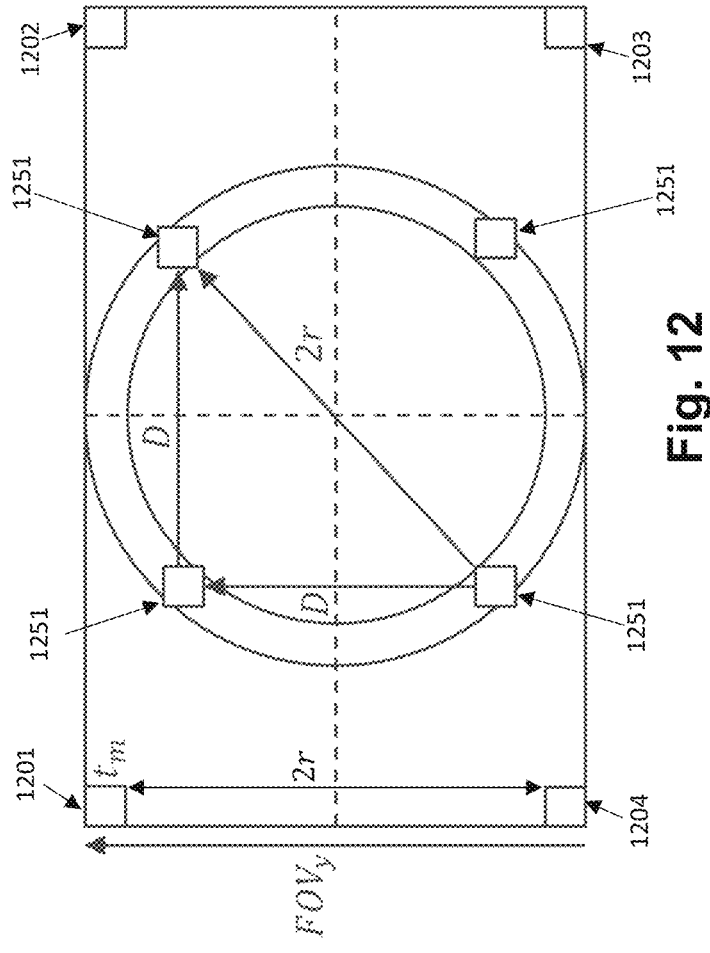
FIG. 12 shows a schematic representation for determining the distance between the markings when rotations are taken into account.
Figures 13A, 13B, 13C, 13D:
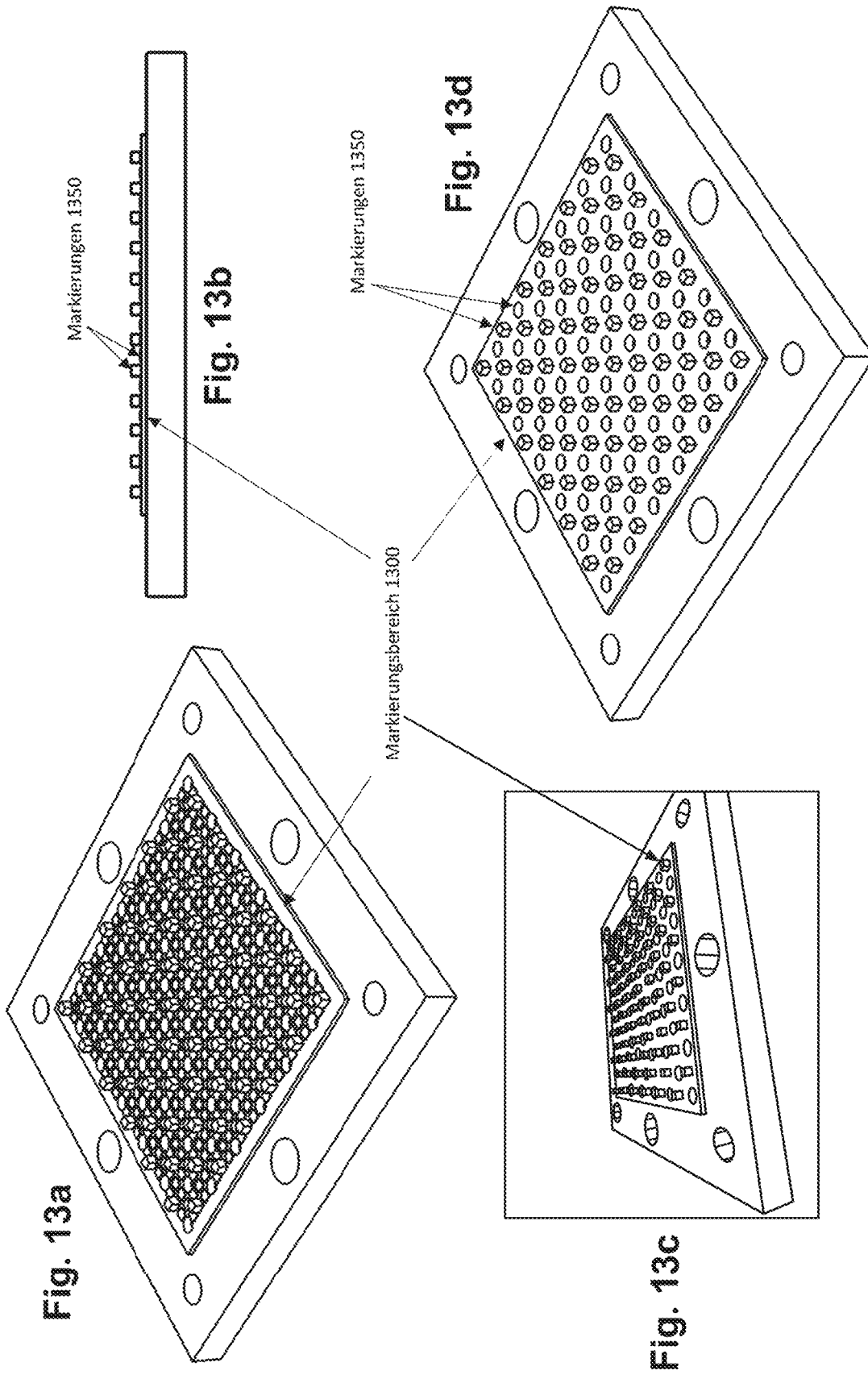
FIGS. 13a to d are marking regions in which the markings are arranged in different planes.

This shall now be explained in more detail with reference to FIG. 12. In FIG. 12, squares 1201, 1202, 1203 and 1204 represent AprilTags without taking rotation into account. As can be seen, the distances in the x and y direction between adjacent tags still differ in size. The distance in the y direction is the shorter distance in this example.

When taking into account rotations about the center of the FOV, the distances are now adjusted such that the AprilTags are all disposed on a radius within the field of view. This results in squares 1251, 1252, 1253, and 1254 which illustrate AprilTags with adjusted distances. As indicated, distance D is selected such that the resulting diameter 2r corresponds to the distance in the y direction, i.e. is smaller than or equal to $$D_y^{max},$$

i.e. e.g.

$$2r = D_y^{min} = \frac{FOV_y - (n_y + 1) * t_m}{n_y} = \sqrt{2}D$$

applies. The result for the distance is therefore:

$$D = \frac{FOV_y - (n_y + 1) * t_m}{\sqrt{2}\, n_y}$$

For $n_y = 1$, this explicitly means:

$$D = \frac{FOV_y - 2t_m}{\sqrt{2}}$$

3D-ATA

In some embodiments, the markings are attached in different planes in the marking region. In particular, two adjacent markings are attached in different planes. However, not all adjacent markings need to be disposed in different planes. This is illustrated in FIGS. 13a, 13b, 13c and 13d. As can be seen, markings 1350 are attached in respective marking regions 1300 in different planes.

The term different planes therefore refers to the fact that the xy planes of the individual markings are at disposed different heights or depths. The markings are therefore offset in the "z direction", where the z direction there is orthogonal to the xy plane previously described. In other words, for a given pose, the different planes are at different working distances, in particular at different distances from the camera. The markings in different planes therefore have different object widths for a given pose.

Figure 14:
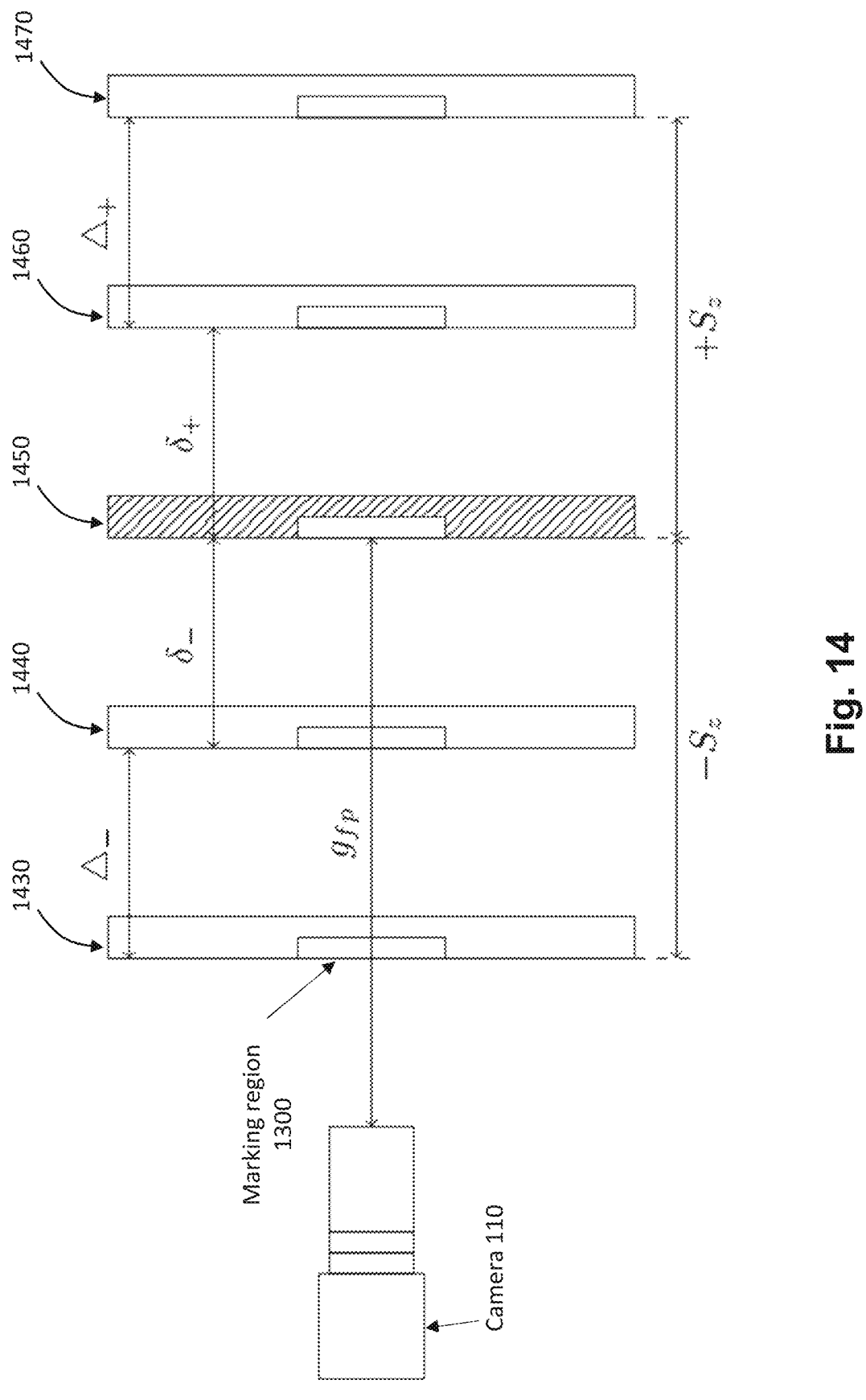
FIG. 14 shows a schematic representation of the increase in size of the work region that can be covered by using multiple planes in which markings are attached.

The use of a 3-dimensional marking region ("3D-ATA") makes it possible to enlarge the work region in which markings can still be recognized sufficiently well by the camera. In this way, a depth of field (also referred to as field depth) can be obtained over the entire desired work region of the parallel mechanism. As illustrated in FIG. 14, this corresponds to adjustment range $\pm S_z$ in the z direction. For a given camera setup with a certain focal distance and plus any intermediate rings, a working distance $g_{fp}$ to the front lens of the objective arises at which the plane is sharply focused (focal plane 1450). Based on this distance, the ATA is shifted in small increments by $\pm S_z$ and the number of tags detected is captured. For example, if a sufficient number of tags is still recognized at an adjustment range of $\pm 5.5$ mm, but the desired adjustment range is $\pm 6.5$ mm, then 1 mm is still "missing" to cover the desired work region of the hexapod. This can be achieved by attaching the tags not in one plane on the ATA, but in multiple planes.

FIG. 14 shows manipulator platforms 1440 and 1460 (e.g. the movable platform of the hexapod, presently representative of marking region 1300) displaced by a length $\pm \delta$ starting out from focal plane 1450, which is disposed at a distance of $g_{fp}$ from the camera. These are the distances measured at which a sufficient number of AprilTags are still recognized.

Manipulator platforms 1430 and 1470 represent the displacement of the manipulator platform corresponding to the maximum desired displacement of the manipulator platform in the z direction, i.e. correspond to the adjustment ranges $\pm S_z$ of the hexapod. This must be achieved. In order to cover the entire desired work region (i.e. to be able to capture a sharp image of a marking), the differences $\pm \Delta$ are overcome by attaching tags to a plane that is raised by $\Delta_+$ or to a plane that is deepened by $\Delta_-$. The distances are there calculated as follows:

Raising by $\Delta_+ = S_z - \delta_+$
Deepening by $\Delta_- = S_z - \delta_-$
In general, as shown in FIG. 14, $\delta_+ = \delta_- = \delta$ or $\Delta = \Delta_+ = \Delta_-$ can also apply; the raised plane is then raised by $\Delta = S_z - \delta$ relative to the focal plane and the deepened plane is deepened by (the same length) $\Delta = S_z - \delta$. More than two planes can also be created. In general, for example, 2k planes can be used, where the markings are attached in planes that are raised or deepened by $$\pm \Delta_i = \frac{\Delta}{k} * i$$

with i={1, . . . , k}, in the z-direction with respect to focal plane 1450. If markings are also attached in the zero plane (i.e. in focal plane 1450, presently $\Delta_0=0$ applies), 2k+1 planes result accordingly. In the x or y direction, the markings can there be assigned periodically to the different planes, for example, following a regular pattern. In particular, the markings can be assigned to the different planes such that any two adjacent markings are disposed in different planes. However, this does not have to be the case and a pattern in which some adjacent markings are disposed in the same plane is also conceivable (cf. FIG. 13*e*).

It is to be pointed out that in the 3D ATA embodiments, the markings are arranged (densely) in such a way or distance D is determined (attachment method) in such a way that two or more markings are always in the field of view of the camera. $n_x$ and/or $n_y$ is then selected to be greater than 1 and distance D between any two adjacent markings therefore satisfies the following formula:

$$2D \leq FOV_{min} - 3t_m$$

$n_x$ and $n_y$ are selected in accordance with the assignment of the markings to the planes, in particular with the number of planes. In particular, $n_x$ and $n_y$ are selected based on the assignment of the markings to the planes such that markings in different planes are always in the field of view. In particular, the number of markings that are always visible can be selected to be greater than or equal to the number of different planes, and the markings can be assigned to the planes in such a way that a marking for each plane is always visible. A marking which can also be focused sufficiently sharply is then always visible. tag spacings $D_x$, $D_y$ can therefore be such that $n_x*n_y$ tags are always in the field of view, and the tags can be arranged in up to $n_x*n_y$ different planes.

Figure 13E:
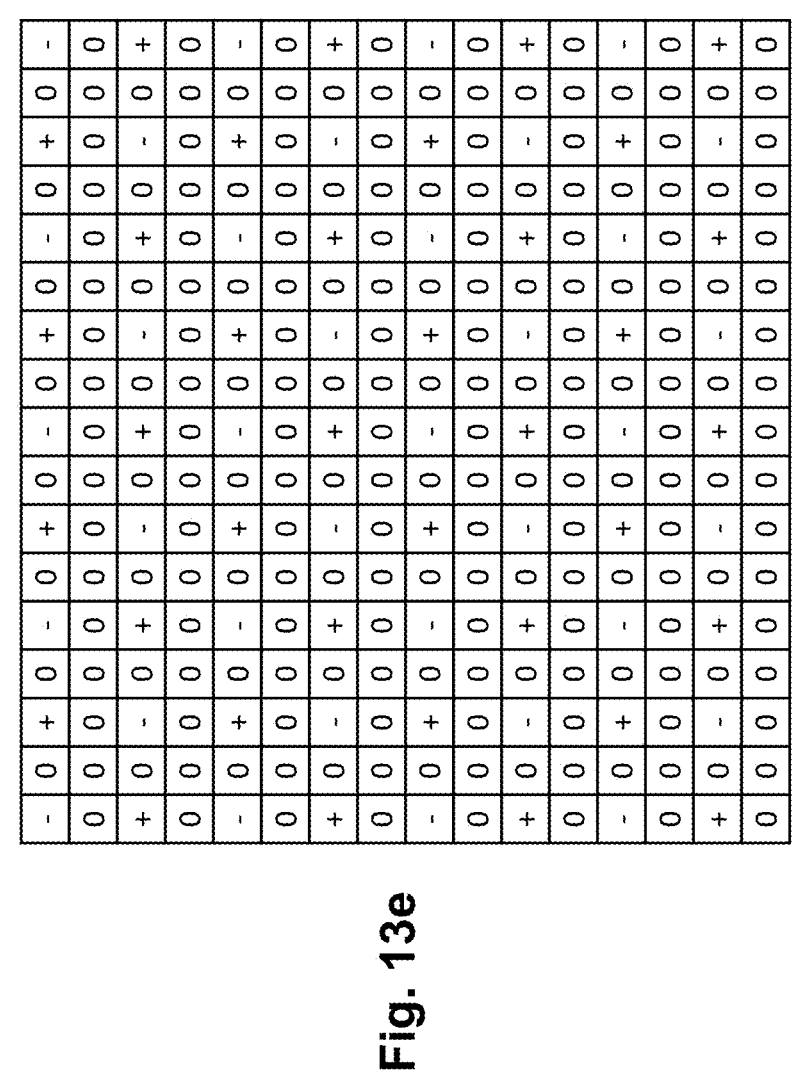

For example, the markings can be assigned to three different planes as shown in FIG. 13*e*. FIG. 13*e* shows a uniform pattern that repeats itself after four markings in the x and y directions, it can therefore be continued accordingly. "0" corresponds to the zero plane/focus plane, "+" to the plane that is raised compared to the zero plane and "−" to the deepened plane. The zero plane is presently therefore used as a frame much more often than the other two planes. The field of view can then be selected, for example, such that four markings in the x direction and four in the y direction are always fully visible (i.e. always a total of 16 markings), which ensures that at least one marking in each of the three planes is always fully visible.

Pose Determination Based on Image of a Marking

As already indicated, the markings or reference markers can be used to determine the pose (position and orientation) of the kinematic system. For this purpose, an image of the marking region, more precisely an image of the currently visible section of the marking region, is captured in accordance with the current field of view of the camera.

It is first to be noted that the term pose of the kinematic system in the present application refers, for example, to the pose of an end effector of the respective kinematic system. The end effector refers, for example, to the last link in a kinematic chain. It is typically the component or assembly for carrying out the actual handling task. In other words, the effector causes the actual interaction of the robot (i.e. the kinematic system) with its environment. An end effector can be in particular a tool, a tool carrier, a gripper, or a platform to be moved (e.g. in the case of hexapods). Furthermore, it is to be noted that the pose of the kinematic system that the kinematic system assumed at the time the image capturing is determined.

More specifically, the markings can be of such nature that the pose of the parallel kinematic system can be determined based on an image of the marking region captured by the camera if the image contains at least a number n of any of the markings in a direction, where n is greater than or equal to 1. In particular, for n=1, the pose of the parallel kinematic system can be determined for each of the markings based on an image of the marking captured by the camera. In other words, it can be sufficient for pose determination that there is any single marking disposed in the image captured. The image can therefore possibly contain no further markings than this one marking and the pose can be determined regardless of which of the markings this one marking is. In general, as already explained above, it can also be sufficient and/or necessary that there are at least n markings in a direction disposed in the image of the marking region, where n can also be greater than one. As before, it does not matter in this case which n markings are disposed in the image in that direction (as long as there are at least n present in the corresponding direction and, as already explained above, there is also a sufficient number of markings in the other direction).

For this purpose, the known position of the sensor or camera that captured the image is used. The differentiability between the individual tags can also be used, which enables unique identification (family and individual), whereby several tags in an image can be recognized and differentiated. Furthermore, it can be used that the position of a marking in space (position and orientation) relative to the camera can be determined based on the image captured. The known position of the individual markings on the array or on the kinematic system can then be used to infer the exact position (position and orientation) of the movable platform from the position of an individual tag. The position (position and rotation) of the captured marking(s) relative to the camera can be determined from a single image and, using the known position/orientation of the camera and the position of the marking on the kinematic system, thus the pose of the kinematic system. This makes it possible to determine the absolute position of, for example, the moving platform of hexapods. Markings that make this possible are in particular the AprilTags already mentioned.

Position recognition using AprilTags can take place in an automated manner in several steps. A 9-step process for AprilTag recognition and determination of the pose of the tag relative to the camera shall be illustrated hereafter:

Step 1 ("Decimate"): The image captured by the camera is reduced in size by any factor N that can be set at runtime. Only every $N^{th}$ row and column is copied into a new image, which is further processed in the subsequent steps. The original is needed again in the "Refinement" and "Decode" steps.

Step 2 ("BlurSharpen"): In this step, the image reduced in size can either be blurred or sharpened using a Gaussian filter. The strength of the filter can be adjustable using a parameter that can be set prior to the start. The sign of the parameter determines whether blurring or sharpening takes place.

Step 3 ("Threshold"): Segmentation takes place into light and dark regions as well as regions with little contrast. A local threshold value method can be used for this purpose. First, the image is divided into four by four pixel tiles whose minimums and maximums each create a new image. The minimum image is eroded and the maximum image is dilated. The threshold value is then calculated from the average between the minimum and the maximum. If the difference is too small, the contrast is not sufficient.

Step 4 ("Connected Components Labeling"): Connected segments are combined to form components and assigned a unique label. A UnionFind data structure can be used for this purpose.

Step 5: (Gradient Cluster): In this step all subpixels that are disposed on the border between a light and a dark component are captured (edge pixels). The eight neighborhood is used there. A separate list of subpixels is maintained for each component combination and stores the position and edge direction. A hash table is used to associate the data with the matching list.

Step 6 ("Quad"): First, the center of an edge is determined using a bounding box that spans all pixels in the list. The pixels are then sorted according to the angle around the center and multiple entries for one position are removed. The algorithm then searches for the vertices of the quadrilateral (the marking is presently assumed to be quadrangular). For this purpose, a straight line is adapted to a window that consists of successive edge pixels. It is pushed over the entire sequence. The corner points of the marking are at the points where the largest adjustment errors occur. At the end, straight lines are adjusted to the sections between the corner points and the intersection points then result in the final corner points of the quadrilaterals.

Step 7 ("Refinement"): Using the original image, the edges of the quadrilaterals found are resampled to thus increase the accuracy that was compromised by reducing the size of the image. The algorithm looks for the largest gradient along the normal at locations that are evenly distributed on the edge. The number of points is one eighth (for $t_b=8$) of the edge length. This results in support points for a recalculation of straight lines along the edge whose intersection points result in the new corner points.

Step 8 ("Decode"): First, the homography between the image coordinates and the quadrilaterals (markings) recognized is calculated. They are used to project sampling points into the original image. The sampling points at the edge of the tag have a known color (black/white). This allows a model of the color gradient to be created from which the threshold values for the actual data points are generated. The tag family provides information about where the known points and the data points are located. Decoding a valid ID also indicates the orientation of the tag.

Step 9 ("Pose Estimation"): In this step, the camera parameters are used. After the homography has been previously calculated, the position and rotation relative to the camera can also be determined therewith. The rotation matrix and the translation vector are calculated using an iterative method.

Example with Numerical Values

Most of the parameters presently mentioned are specified again in the following values together with exemplary values.

Work Region:

The distance $g_{fp}$ of the objective or the front lens, respectively, to the focal plane can be determined, for example, by way of measurements. It describes the distance between the lens and the AprilTag array at which the latter is detected in a focused manner. With an adjustment range of the hexapod in the z direction of $S_z$, this results in a work region of $g_{fp} \pm S_z$.

$$g_{min} = g_{fp} - S_z$$

$$g_{max} = g_{fp} + S_z$$

$$g_{min} \leq g \leq g_{max}$$

If the adjustment ranges of the parallel mechanism in the x, y and z direction are given by $S_x=17$ mm, $S_y=16$ mm, or $S_z=6.5$ mm, leading to a work region $g_{min} \leq g \leq g_{max}$ at an exemplary distance $g_{fp}=20$ mm of:

$$g_{min} = g_{fp} - S_z = 20 \text{ mm} - 6.5 \text{ mm} = 13.5 \text{ mm}$$

$$g_{max} = g_{fp} + S_z = 20 \text{ mm} + 6.5 \text{ mm} = 26.5 \text{ mm}$$

Camera and Field of View:

The following parameters are given by the camera:

Focal distance f=8 mm

Pixel size px=3.45 µm

Sensor dimension in x direction $\text{Sensor}_x=8.446$ mm

Sensor dimension in y direction $\text{Sensor}_y=7.066$ mm

For the minimum and maximum distance, the dimensions of the field of view (FOV) can be calculated from the camera parameters. It arises for the field of view at minimum working distance $g_{min}$ $$FOV_x^{min} = \left(\frac{g_{min}}{f} - 1\right) * \text{Sensor}_x = \left(\frac{13.5 \text{ mm}}{8 \text{ mm}} - 1\right) * 8.446 \text{ mm} = 5.81 \text{ mm}$$

$$FOV_y^{min} = \left(\frac{g_{min}}{f} - 1\right) * \text{Sensor}_y = \left(\frac{13.5 \text{ mm}}{8 \text{ mm}} - 1\right) * 7.066 \text{ mm} = 4.86 \text{ mm}$$

The field of view can also be determined at a maximum working distance $g_{max}$.

$$FOV_x^{max} = \left(\frac{g_{max}}{f} - 1\right) * \text{Sensor}_x = \left(\frac{26.5 \text{ mm}}{8 \text{ mm}} - 1\right) * 8.446 \text{ mm} = 19.53 \text{ mm}$$

$$FOV_y^{max} = \left(\frac{g_{max}}{f} - 1\right) * \text{Sensor}_y = \left(\frac{26.5 \text{ mm}}{8 \text{ mm}} - 1\right) * 7.066 \text{ mm} = 16.34 \text{ mm}$$

Dimensions of the Marking Region

The above exemplary values lead to the dimensions of the marking region:

$$ATA_x = FOV_{x,max} + 2 * S_x = 19.53 \text{ mm} + 2^*17 \text{ mm} = 53.53 \text{ mm}$$

$$ATA_y = FOV_{y,max} + 2 * S_y = 16.34 \text{ mm} + 2^*16 \text{ mm} = 48.34 \text{ mm}$$

Tag Size:

The minimum size of an AprilTag is then calculated in dependence of the maximum working distance as:

$$t_m \geq px * p * t_b * \left(\frac{g_{max}}{f} - 1\right) \geq 3.45 \text{ µm} * 5 * 8 * \left(\frac{26.5 \text{ mm}}{8 \text{ mm}} - 1\right) \geq 0.32 \text{ mm}$$

Distances Between AprilTags:

After specifying $n_x$ and $n_y$, the distance between the AprilTags for the minimum field of view $FOV^{min}$ is calculated according to:

25

$$D_x = \frac{FOV_x^{min} - (n_x + 1) * t_m}{n_x} \quad D_y = \frac{FOV_y^{min} - (n_y + 1) * t_m}{n_y}$$

When the known dependencies for $$FOV_x^{min}$$

and $t_m$ are entered into the above equation, the distance between the AprilTags results in general form as:

$$D_x = \frac{FOV_x^{min} - (n_x + 1) * t_m}{n_x} =$$

$$\frac{\left(\frac{g_{fp} - S_z}{f} - 1\right) * \text{Sensor}_x - (n_x + 1) * px * p * t_b * \left(\frac{g_{fp} + S_z}{f} - 1\right)}{n_x}$$

If $n_x = n_y = 1$ is specified as the desired number of AprilTags in the x or y direction, the following then results numerically with above example values:

$$D_x = \frac{5.81 \text{ mm} - (1 + 1) * 0.32 \text{ mm}}{1} = 5.17 \text{ mm}$$

$$D_y = \frac{4.86 \text{ mm} - (1 + 1) * 0.32 \text{ mm}}{1} = 4.22 \text{ mm}$$

For $n_x = n_y = 3$, however, $D_x = 1.51$ mm and $D_y = 1.194$ mm would result.

Taking into account the rotation, the distances for $n_x = n_y = 1$ shorten to:

$$D_x = D_y = D = \frac{4.86 \text{ mm} - (1 + 1) * 0.32 \text{ mm}}{\sqrt{2}} = 2.984 \text{ mm}$$

In summary, the present invention relates to parallel kinematic systems as well as to methods for producing parallel kinematic systems. A parallel kinematic system according to the invention comprises mutually distinguishable markings which are attached to the parallel kinematic system in a marking region. The marking region is a region of the kinematic system that moves along with the pose of the kinematic system.

According to one aspect of the present invention, the markings are attached at a distance in a direction that ensures that n markings are always fully visible in the direction, and the pose of the parallel kinematic system can be determined based on an image captured by the camera which contains at least n markings in the direction. A corresponding attachment method relates to the respective application of markings.

According to a further aspect of the present invention, the markings are attached at a distance that ensures that n or more markings are fully visible in a direction, the markings are attached in different planes, and the pose of the parallel kinematic system can be determined based on an image captured by the camera that contains at least any n markings in the direction. A respective attachment method relates to the appropriate attachment of markings.

26

The invention claimed is:

1. An arrangement with a parallel kinematic system and means for determining the pose of the parallel kinematic system comprising:
   a camera and a marking region with mutually distinguishable markings, wherein the camera is configured to observe the marking region in different poses of the parallel kinematic system, wherein
   the means for determining the pose of the parallel kinematic system are configured to determine the pose of the parallel kinematic system based only on images of the marking region captured by the camera if one of the images contains at least a number n of any of the markings in a direction, wherein n is greater than or equal to 1, where
   a distance, D, between any two markings that are adjacent in the direction satisfies the following formula:

$$\frac{FOV_{min} - (n + 2) * t_m}{n + 1} < D \le \frac{FOV_{min} - (n + 1) * t_m}{n},$$

wherein
   $t_m$ is the length of one of the markings,
   $FOV_{min}$ is a length of the section of the marking region which falls into the field of view of the camera at a minimum distance of the camera from the marking region, wherein
   the minimum distance is a minimum distance among the distances that the marking region can be away from the camera due to pose changes.

2. The parallel kinematic system according to claim 1, wherein
   the length $FOV_{min}$ satisfies the following equation:

$$FOV_{min} = \left(\frac{g_{min}}{f} - 1\right) l_{Sensor},$$

$g_{min}$ is the minimum distance, $l_{sensor}$ is a length of the sensor of the camera and f is a focal distance of the camera.

3. The parallel kinematic system according to claim 1, wherein
   the markings are arranged in the marking region according to a regular arrangement pattern.

4. The parallel kinematic system according to claim 1, wherein
   the marking region is attached to an underside of a work platform of the parallel kinematic system and the camera is attached in or on a base of the parallel kinematic system and is directed towards the underside of the work platform, or
   the marking region is attached in or on the base of the parallel kinematic system and the camera is attached to an underside of the work platform and is directed towards the base of the parallel kinematic system.

5. The parallel kinematic system according to claim 1, wherein
   the length $t_m$ of a marking satisfies the following equation:

$$t_m \ge px * p * t_b * \left(\frac{g_{max}}{f} - 1\right),$$

wherein
    p is a value that is dependent upon the camera greater than or equal to 2 and less than or equal to 5,
    px is the length that corresponds to a sampling value of the camera,
    $g_{max}$ is a maximum distance among the distances that the marking region can be away from the camera due to pose changes,
    f is a focal distance of the camera, and
    $t_b$ is the number of information units of the marking.

6. The parallel kinematic system according to claim 1, wherein
    the markings are reference markings selected from ARToolKit markings, ArUco markings, QR codes, and AprilTag markings.

7. The parallel kinematic system according to claim 1, wherein
    each of the markings consists of several squares, wherein the squares correspond to the information units and a bit can be encoded in each square.

8. A method for attaching mutually distinguishable markings to a parallel kinematic system of an arrangement according to claim 1 in a marking region so that the pose of the parallel kinematic system can be determined based only on images of the marking region captured by a camera if one of the images contains at least a predetermined number, n, of markings in a direction, wherein n is greater than or equal to 1, the method comprising:
    determining a distance, D, between any two markings that are adjacent in the direction according to the following formula:

$$\frac{FOV_{min} - (n + 2) * t_m}{n + 1} < D \le \frac{FOV_{min} - (n + 1) * t_m}{n},$$

wherein
    $t_m$ is the length of one of the markings,
    $FOV_{min}$ is a length of the section of the marking region which falls into the field of view of the camera at a minimum distance of the camera from the marking region, wherein
    the minimum distance is a minimum distance among the distances that the marking region can be away from the camera due to pose changes, and
    attaching respectively adjacent markings at the determined distance.

9. An arrangement with a parallel kinematic system and means for determining the pose of the parallel kinematic system comprising:
    a camera and a marking region with mutually distinguishable markings, wherein the camera is configured to observe the marking region in different poses of the parallel kinematic system, wherein a distance, D, between any two markings that are adjacent in a direction satisfies the following formula:

$$D \le \frac{FOV_{min} - (n + 1) * t_m}{n},$$

wherein
    $t_m$ is the length of one of the markings,
    $FOV_{min}$ is a length of the section of the marking region which falls into the field of view of the camera at a minimum distance of the camera from the marking region, wherein
    the minimum distance is a minimum distance among the distances that the marking region can be away from the camera due to pose changes,
    the markings are disposed in different planes, and
    the means for determining the pose of the parallel kinematic system are configured to determine the pose of the parallel kinematic system based only on images of the marking region captured by the camera if one of the images contains at least a number, n, of any of the markings in a direction, wherein n is greater than or equal to 2.

10. A method for attaching mutually distinguishable markings to a parallel kinematic system of an arrangement according to claim 9 in a marking region so that the pose of the parallel kinematic system can be determined based only on images of the marking region captured by a camera if one of the images contains at least a predetermined number, n, of markings in a direction, wherein n is greater than or equal to 2, the method comprising:
    determining a distance, D, between any two markings that are adjacent in the direction according to the following formula:

$$D \le \frac{FOV_{min} - (n + 1) * t_m}{n},$$

wherein
    $t_m$ is the length of one of the markings,
    $FOV_{min}$ is a length of the section of the marking region which falls into the field of view of the camera at a minimum distance of the camera from the marking region, wherein
    the minimum distance is a minimum distance among the distances that the marking region can be away from the camera due to pose changes, and
    attaching any markings that are adjacent in the direction at the determined distance, where
    the markings are attached such that they are disposed in different planes.

\* \* \* \* \*